United States Patent
Ahn et al.

(10) Patent No.: US 11,477,799 B2
(45) Date of Patent: *Oct. 18, 2022

(54) WIRELESS COMMUNICATION METHOD AND WIRELESS COMMUNICATION TERMINAL

(71) Applicants: WILUS INSTITUTE OF STANDARDS AND TECHNOLOGY INC., Gyeonggi-do (KR); SK TELECOM CO., LTD., Seoul (KR)

(72) Inventors: Woojin Ahn, Gyeonggi-do (KR); Yongho Kim, Incheon (KR); Jinsam Kwak, Gyeonggi-do (KR); Juhyung Son, Gyeonggi-do (KR)

(73) Assignees: WILUS INSTITUTE OF STANDARDS AND TECHNOLOGY INC., Gyeonggi-Do (KR); SK TELECOM CO., LTD., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/994,630

(22) Filed: Aug. 16, 2020

(65) Prior Publication Data

US 2020/0383125 A1    Dec. 3, 2020

Related U.S. Application Data

(63) Continuation of application No. 15/511,581, filed as application No. PCT/KR2015/009663 on Sep. 15, 2015, now Pat. No. 10,772,109.

(30) Foreign Application Priority Data

Sep. 15, 2014  (KR) .................. 10-2014-0121771
Oct. 13, 2014  (KR) .................. 10-2014-0137941
Oct. 29, 2014  (KR) .................. 10-2014-0148481

(51) Int. Cl.
*H04W 72/12*    (2009.01)
*H04W 74/08*    (2009.01)
(Continued)

(52) U.S. Cl.
CPC ....... *H04W 72/12* (2013.01); *H04W 52/0225* (2013.01); *H04W 74/0816* (2013.01); *H04W 84/12* (2013.01); *Y02D 30/70* (2020.08)

(58) Field of Classification Search
CPC ............. H04W 72/12; H04W 52/0225; H04W 74/0816; H04W 84/12
See application file for complete search history.

(56) References Cited

U.S. PATENT DOCUMENTS 5,884,171 A     3/1999  Tanabe et al.
2005/0089005 A1 4/2005  Sakoda et al.
(Continued)

FOREIGN PATENT DOCUMENTS

KR  10-2010-0084139   7/2010
KR  10-2011-0093566   8/2011
KR  10-2011-0102161   9/2011

OTHER PUBLICATIONS

Office Action dated Mar. 18, 2021 for Korean Patent Application No. 10-2017-7007159 and its English translation provided by Applicant's foreign counsel.

(Continued)

*Primary Examiner* — Shukri Taha
(74) *Attorney, Agent, or Firm* — Ladas & Parry, LLP

(57) ABSTRACT

Provided is a wireless communication terminal. The wireless communication terminal includes: a transceiver configured for transmitting/receiving a wireless signal; and a processor configured for controlling an operation of the wireless communication terminal. The transceiver receives a first frame indicating that there is data to be transmitted from (Continued)

a base wireless communication terminal to a plurality of wireless communication terminals including the wireless communication terminal and receives data based on the first frame. The base wireless communication terminal is any one wireless communication terminal different from the plurality of wireless communication terminals.

4 Claims, 20 Drawing Sheets

(51) Int. Cl.
*H04W 52/02* (2009.01)
*H04W 84/12* (2009.01)

(56) References Cited

U.S. PATENT DOCUMENTS

| | | |
|---|---|---|
| 2006/0227802 A1 | 10/2006 | Du et al. |
| 2010/0182987 A1 | 7/2010 | Shin et al. |
| 2012/0014245 A1 | 1/2012 | Park et al. |
| 2012/0177361 A1 | 7/2012 | Hirano et al. |
| 2013/0044877 A1 | 2/2013 | Liu et al. |
| 2013/0176974 A1 | 7/2013 | Dinan |
| 2013/0188760 A1 | 7/2013 | Subramania et al. |
| 2014/0378114 A1 | 12/2014 | Lim et al. |
| 2015/0009881 A1 | 1/2015 | Yeh et al. |
| 2015/0020157 A1 | 1/2015 | Kim et al. |
| 2016/0150507 A1 | 5/2016 | Kim et al. |
| 2016/0309430 A1* | 10/2016 | Chae ................ H04W 72/0446 |
| 2017/0150492 A1 | 5/2017 | Ozaki |
| 2017/0230915 A1* | 8/2017 | Kim ........................ H04L 5/003 |
| 2017/0295588 A1 | 10/2017 | Ahn et al. |

OTHER PUBLICATIONS

International Search Report for PCT/KR2015/009663 dated Jan. 20, 2016 and its English translation from WIPO.
Written Opinion of the International Searching Authority for PCT/KR2015/009663 dated Jan. 20, 2016 and its English translation from WIPO.
Notice of Allowance dated May 8, 2020 for U.S. Appl. No. 15/511,581 (now published as U.S. 2017/0295588)
Final Office Action dated Jan. 27, 2020 for U.S. Appl. No. 15/511,581 (now published as U.S. 2017/0295588).
Non-Final Office Action dated Jul. 30, 2019 for U.S. Appl. No. 15/511,581 (now published as U.S. 2017/0295588).
Advisory Action dated Jul. 9, 2019 for U.S. Appl. No. 15/511,581 (now published as U.S. 2017/0295588).
Final Office Action dated Apr. 4, 2019 for U.S. Appl. No. 15/511,581 (now published as U.S. 2017/0295588).
Non-Final Office Action dated Sep. 14, 2018 for U.S. Appl. No. 15/511,581 (now published as U.S. 2017/0295588).
Office Action dated Jul. 19, 2021 for U.S. Appl. No. 16/994,629.

* cited by examiner

WIRELESS COMMUNICATION METHOD AND WIRELESS COMMUNICATION TERMINAL

CROSS-REFERENCE TO RELATED APPLICATIONS

This application is a continuation of U.S. patent application Ser. No. 15/511,581 filed on Mar. 15, 2017, which is the U.S. National Stage of International Patent Application No. PCT/KR2015/009663 filed on Sep. 15, 2015, which claims the priority to Korean Patent Application No. 10-2014-0121771 filed in the Korean Intellectual Property Office on Sep. 15, 2014, Korean Patent Application No. 10-2014-0137941 filed in the Korean Intellectual Property Office on Oct. 13, 2014, and Korean Patent Application No. 10-2014-0148481 filed in the Korean Intellectual Property Office on Oct. 29, 2014, the entire contents of which are incorporated herein by reference.

TECHNICAL FIELD

The present invention relates to a wireless communication method and a wireless communication terminal for setting a broadband link. More specifically, the present invention relates to a wireless communication method and a wireless communication terminal for increasing data communication efficiency by expanding a data transmission bandwidth of a terminal.

BACKGROUND ART

In recent years, with supply expansion of mobile apparatuses, a wireless LAN technology that can provide a rapid wireless Internet service to the mobile apparatuses has been significantly spotlighted. The wireless LAN technology allows mobile apparatuses including a smart phone, a smart pad, a laptop computer, a portable multimedia player, an embedded apparatus, and the like to wirelessly access the Internet in home or a company or a specific service providing area based on a wireless communication technology in a short range.

Institute of Electrical and Electronics Engineers (IEEE) 802.11 has commercialized or developed various technological standards since an initial wireless LAN technology is supported using frequencies of 2.4 GHz. First, the IEEE 802.11b supports a communication speed of a maximum of 11 Mbps while using frequencies of a 2.4 GHz band. IEEE 802.11a which is commercialized after the IEEE 802.11b uses frequencies of not the 2.4 GHz band but a 5 GHz band to reduce an influence by interference as compared with the frequencies of the 2.4 GHz band which are significantly congested and improves the communication speed up to a maximum of 54 Mbps by using an OFDM technology. However, the IEEE 802.11a has a disadvantage in that a communication distance is shorter than the IEEE 802.11b. In addition, IEEE 802.11g uses the frequencies of the 2.4 GHz band similarly to the IEEE 802.11b to implement the communication speed of a maximum of 54 Mbps and satisfies backward compatibility to significantly come into the spotlight and further, is superior to the IEEE 802.11a in terms of the communication distance.

Moreover, as a technology standard established to overcome a limitation of the communication speed which is pointed out as a weak point in a wireless LAN, IEEE 802.11n has been provided. The IEEE 802.11n aims at increasing the speed and reliability of a network and extending an operating distance of a wireless network. In more detail, the IEEE 802.11n supports a high throughput (HT) in which a data processing speed is a maximum of 540 Mbps or more and further, is based on a multiple inputs and multiple outputs (MIMO) technology in which multiple antennas are used at both sides of a transmitting unit and a receiving unit in order to minimize a transmission error and optimize a data speed. Further, the standard can use a coding scheme that transmits multiple copies which overlap with each other in order to increase data reliability.

As the supply of the wireless LAN is activated and further, applications using the wireless LAN are diversified, the need for new wireless LAN systems for supporting a higher throughput (very high throughput (VHT)) than the data processing speed supported by the IEEE 802.11n has come into the spotlight. Among them, IEEE 802.11ac supports a wide bandwidth (80 to 160 MHz) in the 5 GHz frequencies. The IEEE 802.11ac standard is defined only in the 5 GHz band, but initial 11ac chipsets will support even operations in the 2.4 GHz band for the backward compatibility with the existing 2.4 GHz band products. Theoretically, according to the standard, wireless LAN speeds of multiple stations are enabled up to a minimum of 1 Gbps and a maximum single link speed is enabled up to a minimum of 500 Mbps. This is achieved by extending concepts of a radio interface accepted by 802.11n, such as a wider radio frequency bandwidth (a maximum of 160 MHz), more MIMO spatial streams (a maximum of 8), multi-user MIMO, and high-density modulation (a maximum of 256 QAM). Further, as a scheme that transmits data by using a 60 GHz band instead of the existing 2.4 GHz/5 GHz, IEEE 802.11ad has been provided. The IEEE 802.11ad is a transmission standard that provides a speed of a maximum of 7 Gbps by using a beamforming technology and is suitable for high bit rate moving picture streaming such as massive data or non-compression HD video. However, since it is difficult for the 60 GHz frequency band to pass through an obstacle, it is disadvantageous in that the 60 GHz frequency band can be used only among devices in a short-distance space.

Meanwhile, in recent years, as next-generation wireless LAN standards after the 802.11ac and 802.11ad, discussion for providing a high-efficiency and high-performance wireless LAN communication technology in a high-density environment is continuously performed. That is, in a next-generation wireless LAN environment, communication having high frequency efficiency needs to be provided indoors/outdoors under the presence of high-density stations and access points (APs) and various technologies for implementing the communication are required.

Especially, as the number of devices using a wireless LAN increases, it is necessary to efficiently use a predetermined channel. Therefore, required is a technology capable of efficiently using bandwidths by simultaneously transmitting data between a plurality of stations and APs.

DISCLOSURE

Technical Problem

An object of the present invention is to provide an efficient wireless communication method and wireless communication terminal.

Another object of the present invention is to provide a wireless communication method in which one wireless communication terminal transmits data to a plurality of wireless communication terminals simultaneously and a wireless communication terminal.

Another object of the present invention is to provide a wireless communication method in which a plurality of wireless communication terminals transmit data to one wireless communication terminal simultaneously and a wireless communication terminal.

Technical Solution

To achieve these and other advantages and in accordance with the purpose of the present invention, as embodied and broadly described, there is provided a wireless communication terminal including: a transceiver for transmitting/receiving a wireless signal; and a processor for controlling an operation of the wireless communication terminal, wherein the transceiver receives a first frame indicating that there is data to be transmitted from a base wireless communication terminal to a plurality of wireless communication terminals including the wireless communication terminal and receives data based on the first frame, wherein the base wireless communication terminal is any one wireless communication terminal different from the plurality of wireless communication terminals.

The first frame may include a plurality of identifiers for respectively identifying the plurality of wireless communication terminals.

The transceiver may transmit to the base wireless communication terminal a second frame indicating that the wireless communication terminal is ready to receive data based on the first frame.

The transceiver may receive data from the base wireless communication terminal and receive information indicating that data transmission is terminated.

The processor may enter a sleep mode based on the information that the data transmission is terminated.

The information that the data transmission is terminated may include a repeating specific pattern.

The processor may maintain the sleep mode until data transmission for the plurality of wireless communication terminals of the base wireless communication terminal is completed and wake up when the data transmission for the plurality of wireless communication terminals of the base wireless communication terminal is completed.

The transceiver may receive information indicating that the transmission is terminated and transmit a third frame indicating whether data is received to any one wireless communication terminal among the plurality of wireless communication terminals, and any one wireless communication terminal among the plurality of wireless communication terminals may be a wireless communication terminal different from the wireless communication terminal.

Any one wireless communication terminal among the plurality of wireless communication terminals may transmit to the base wireless communication terminal a fourth frame indicating whether any one wireless communication terminal among the plurality of wireless communication terminals receives data and whether the wireless communication terminal receives data based on the third frame.

The transceiver may receive a fifth frame indicating a method of accessing the base wireless communication terminal.

The fifth frame may include at least one of an access time point for accessing the base wireless communication terminal, an orthogonal code used for access, and a channel used for access.

The fifth frame may include information on a plurality of channels accessible to the base wireless communication terminal, wherein the processor may access the base wireless communication terminal by selecting any one of the plurality of channels.

The fifth frame may be identical to the first frame.

The plurality of wireless communication terminals may communicate with the base wireless communication terminal through one Radio Frequency (RF)-chain.

The plurality of wireless communication terminal may have a time difference between times required for receiving data from the base wireless communication terminal within a reference value.

According to another aspect of the present invention, there is provided a base wireless communication terminal including: a transceiver for transmitting/receiving a wireless signal; and a processor configured for controlling an operation of the wireless communication terminal, wherein the transceiver transmits a first frame indicating that there is data to be transmitted from the base wireless communication terminal to a plurality of wireless communication terminals and transmits data to the plurality of wireless communication terminals, wherein the base wireless communication terminal is any one wireless communication terminal different from the plurality of wireless communication terminals.

The first frame may include a plurality of identifiers for respectively identifying the plurality of wireless communication terminals.

The transceiver may receive a second frame indicating ready to receive data from the plurality of wireless communication terminals, and transmit data to the plurality of wireless communication terminals based on the second frame.

The transceiver may complete data transmission to any one wireless communication terminal among the plurality of wireless communication terminals while transmitting data to the plurality of wireless communication terminals, and transmit information indicating that data transmission is completed to any one wireless communication terminal among the plurality of wireless communication terminals.

According to a further another aspect of the present invention, there is provided an operation method of a wireless communication terminal, the method including: receiving a first frame indicating there is data to be transmitted from a base wireless communication terminal to a plurality of wireless communication terminals including the wireless communication terminal; and receiving data based on the first frame, wherein the base wireless communication terminal is any one wireless communication terminal different from the plurality of wireless communication terminals.

Advantageous Effects

One embodiment of the present invention provides an efficient wireless communication method and wireless communication terminal.

Especially, one embodiment of the present invention provides a wireless communication method in which one wireless communication terminal transmits data to a plurality of wireless communication terminals simultaneously and a wireless communication terminal.

In addition, one embodiment of the present invention provides a wireless communication method in which a plurality of wireless communication terminals transmit data to one wireless communication terminal simultaneously and a wireless communication terminal.

MODE FOR CARRYING OUT THE INVENTION

Figure 1:
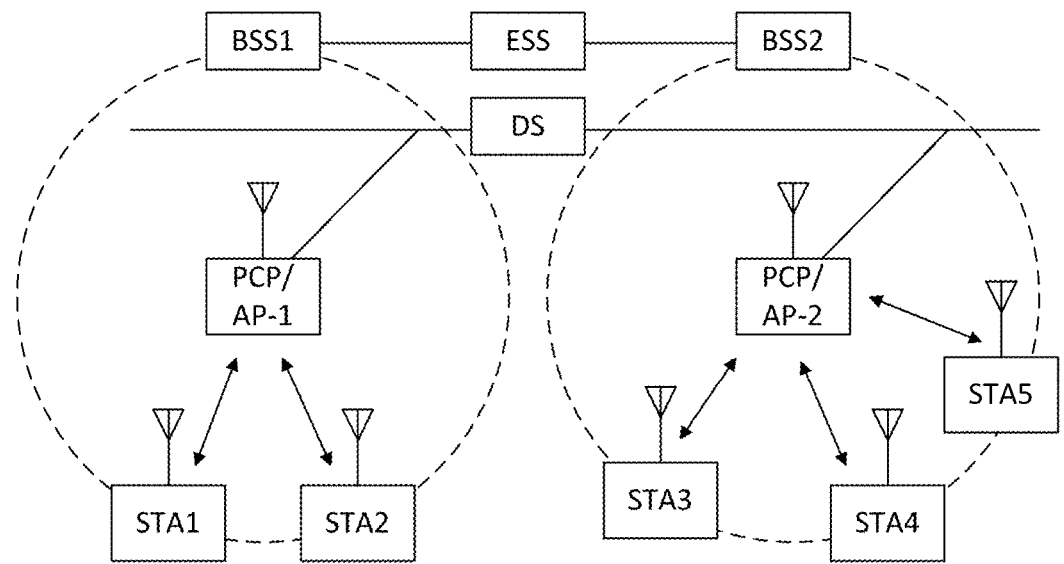
FIG. 1 is a view illustrating a wireless LAN system according to an embodiment of the present invention.

Preferred embodiments of the present invention will be described below in more detail with reference to the accompanying drawings. The present invention may, however, be embodied in different forms and should not be constructed as limited to the embodiments set forth herein. Parts not relating to description are omitted in the drawings in order to clearly describe the present invention and like reference numerals refer to like elements throughout.

Furthermore, when it is described that one comprises (or includes or has) some elements, it should be understood that it may comprise (or include or has) only those elements, or it may comprise (or include or have) other elements as well as those elements if there is no specific limitation.

This application claims priority to and the benefit of Korean Patent Application Nos. 10-2014-01217, Nos. 10-2014-0137941, and Nos 10-2014-0148481 filed in the Korean Intellectual Property Office and the embodiments and mentioned items described in the respective applications are included in the Detailed Description of the present application.

FIG. 1 is a diagram illustrating a wireless LAN system according to an embodiment of the present invention. The wireless LAN system includes one or more basic service sets (BSS) and the BSS represents a set of apparatuses which are successfully synchronized with each other to communicate with each other. In general, the BSS may be classified into an infrastructure BSS and an independent BSS (IBSS) and FIG. 1 illustrates the infrastructure BSS between them.

As illustrated in FIG. 1, the infrastructure BSS (BSS1 and BSS2) includes one or more stations STA1, STA2, STA3, STA4, and STA5, access points PCP/AP-1 and PCP/AP-2 which are stations providing a distribution service, and a distribution system (DS) connecting the multiple access points PCP/AP-1 and PCP/AP-2.

The station (STA) is a predetermined device including medium access control (MAC) following a regulation of an IEEE 802.11 standard and a physical layer interface for a radio medium, and includes both a non-access point (non-AP) station and an access point (AP) in a broad sense. Further, in the present specification, a term 'terminal' may be used to refer to a concept including a wireless LAN communication device such as non-AP STA, or an AP, or both terms. A station for wireless communication includes a processor and a transceiver and according to the embodiment, may further include a user interface unit and a display unit. The processor may generate a frame to be transmitted through a wireless network or process a frame received through the wireless network and besides, perform various processing for controlling the station. In addition, the transceiver is functionally connected with the processor and transmits and receives frames through the wireless network for the station.

The access point (AP) is an entity that provides access to the distribution system (DS) via wireless medium for the station associated therewith. In the infrastructure BSS, communication among non-AP stations is, in principle, performed via the AP, but when a direct link is configured, direct communication is enabled even among the non-AP stations. Meanwhile, in the present invention, the AP is used as a concept including a personal BSS coordination point (PCP) and may include concepts including a centralized controller, a base station (BS), a node-B, a base transceiver system (BTS), and a site controller in a broad sense.

A plurality of infrastructure BSSs may be connected with each other through the distribution system (DS). In this case, a plurality of BSSs connected through the distribution system is referred to as an extended service set (ESS).

Figure 2:
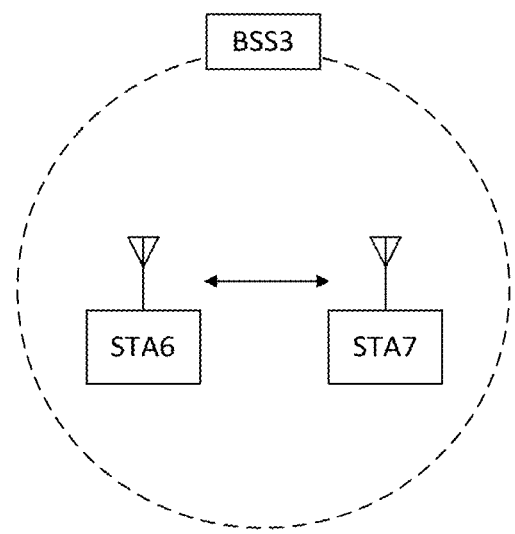
FIG. 2 is a view illustrating a wireless LAN system according to another embodiment of the present invention.

FIG. 2 illustrates an independent BSS which is a wireless LAN system according to another embodiment of the present invention. In the embodiment of FIG. 2, duplicative description of parts, which are the same as or correspond to the embodiment of FIG. 1, will be omitted.

Since a BSS3 illustrated in FIG. 2 is the independent BSS and does not include the AP, all stations STA6 and STA7 are not connected with the AP. The independent BSS is not permitted to access the distribution system and forms a self-contained network. In the independent BSS, the respective stations STA6 and STA7 may be directly connected with each other.

Figure 3:
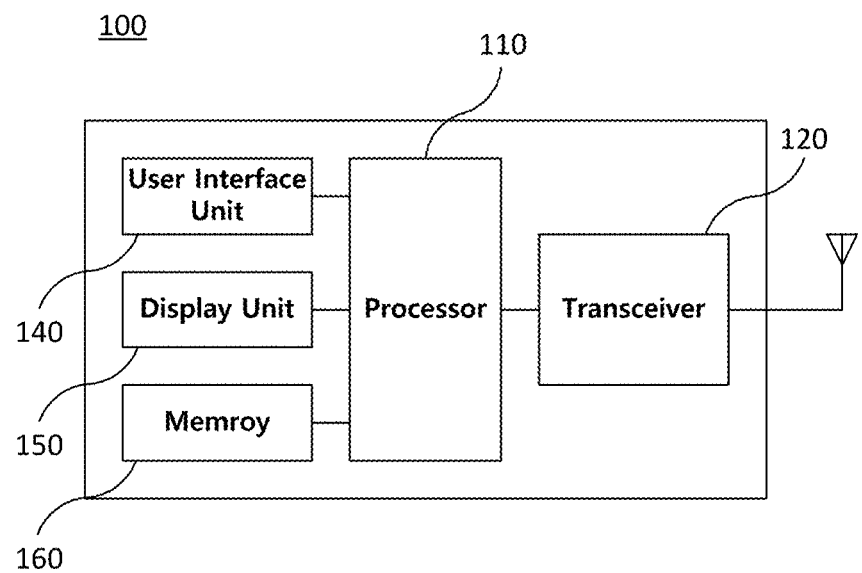
FIG. 3 is a block diagram illustrating a configuration of a station according to an embodiment of the present invention.

FIG. 3 is a block diagram illustrating a configuration of a station 100 according to an embodiment of the present invention.

As illustrated in FIG. 3, the station 100 according to the embodiment of the present invention may include a processor 110, a transceiver 120, a user interface unit 140, a display unit 150, and a memory 160.

First, the transceiver 120 transmits and receives a radio signal such as a wireless LAN packet, or the like and may be embedded in the station 100 or provided as an exterior. According to the embodiment, the transceiver 120 may include at least one transmit/receive module using different frequency bands. For example, the transceiver 120 may include transmit/receive modules having different frequency bands such as 2.4 GHz, 5 GHz, and 60 GHz. According to an embodiment, the station 100 may include a transmit/receive module using a frequency band of 6 GHz or more and a transmit/receive module using a frequency band of 6 GHz or less. The respective transmit/receive modules may perform wireless communication with the AP or an external station according to a wireless LAN standard of a frequency band supported by the corresponding transmit/receive module. The transceiver 120 may operate only one transmit/receive module at a time or simultaneously operate multiple transmit/receive modules together according to the performance and requirements of the station 100. When the station 100 includes a plurality of transmit/receive modules, each transmit/receive module may be implemented by independent elements or a plurality of modules may be integrated into one chip.

Next, the user interface unit 140 includes various types of input/output means provided in the station 100. That is, the user interface unit 140 may receive a user input by using various input means and the processor 110 may control the station 100 based on the received user input. Further, the user interface unit 140 may perform output based on a command of the processor 110 by using various output means.

Next, the display unit 150 outputs an image on a display screen. The display unit 150 may output various display objects such as contents executed by the processor 110 or a user interface based on a control command of the processor 110, and the like. Further, the memory 160 stores a control program used in the station 100 and various resulting data. The control program may include an access program required for the station 100 to access the AP or the external station.

The processor 110 of the present invention may execute various commands or programs and process data in the station 100. Further, the processor 110 may control the respective units of the station 100 and control data transmission/reception among the units. According to the embodiment of the present invention, the processor 110 may execute the program for accessing the AP stored in the memory 160 and receive a communication configuration message transmitted by the AP. Further, the processor 110 may read information on a priority condition of the station 100 included in the communication configuration message and request the access to the AP based on the information on the priority condition of the station 100. The processor 110 of the present invention may represent a main control unit of the station 100 and according to the embodiment, the processor 110 may represent a control unit for individually controlling some component of the station 100, for example, the transceiver 120, and the like. The processor 110 controls various operations of radio signal transmission/reception of the station 100 according to the embodiment of the present invention. A detailed embodiment thereof will be described below.

The station 100 illustrated in FIG. 3 is a block diagram according to an embodiment of the present invention, where separate blocks are illustrated as logically distinguished elements of the device. Accordingly, the elements of the device may be mounted in a single chip or multiple chips depending on design of the device. For example, the processor 110 and the transceiver 120 may be implemented while being integrated into a single chip or implemented as a separate chip. Further, in the embodiment of the present invention, some components of the station 100, for example, the user interface unit 140 and the display unit 150 may be optionally provided in the station 100.

Figure 4:
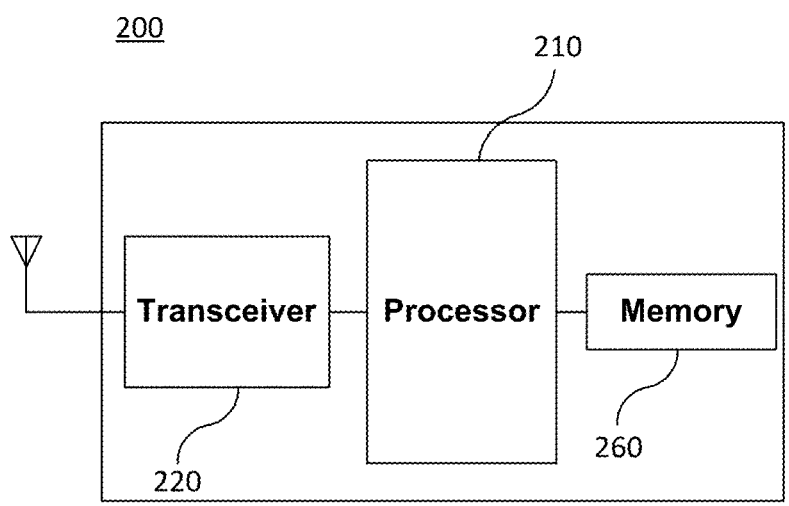
FIG. 4 is a block diagram illustrating a configuration of an access point according to an embodiment of the present invention.

FIG. 4 is a block diagram illustrating a configuration of an AP 200 according to an embodiment of the present invention.

As illustrated in FIG. 4, the AP 200 according to the embodiment of the present invention may include a processor 210, a transceiver 220, and a memory 260. In FIG. 4, among the components of the AP 200, duplicative description of parts which are the same as or correspond to the components of the station 100 of FIG. 2 will be omitted.

Referring to FIG. 4, the AP 200 according to the present invention includes the transceiver 220 for operating the BSS in at least one frequency band. As described in the embodiment of FIG. 3, the transceiver 220 of the AP 200 may also include a plurality of transmit/receive modules using different frequency bands. That is, the AP 200 according to the embodiment of the present invention may include two or more transmit/receive modules among different frequency bands, for example, 2.4 GHz, 5 GHz, and 60 GHz together. Preferably, the AP 200 may include a transmit/receive module using a frequency band of 6 GHz or more and a transmit/receive module using a frequency band of 6 GHz or less. The respective transmit/receive modules may perform wireless communication with the station according to a wireless LAN standard of a frequency band supported by the corresponding transmit/receive module. The transceiver 220 may operate only one transmit/receive module at a time or simultaneously operate multiple transmit/receive modules together according to the performance and requirements of the AP 200.

Next, the memory 260 stores a control program used in the AP 200 and various resulting data. The control program may include an access program for managing the access of the station. Further, the processor 210 may control the respective units of the AP 200 and control data transmission/reception among the units. According to the embodiment of the present invention, the processor 210 may execute the program for accessing the station stored in the memory 260 and transmit communication configuration messages for one or more stations. In this case, the communication configuration messages may include information about access priority conditions of the respective stations. Further, the processor 210 performs an access configuration according to an access request of the station. The processor 210 controls various operations such as radio signal transmission/reception of the AP 200 according to the embodiment of the present invention. A detailed embodiment thereof will be described below.

Figure 5:
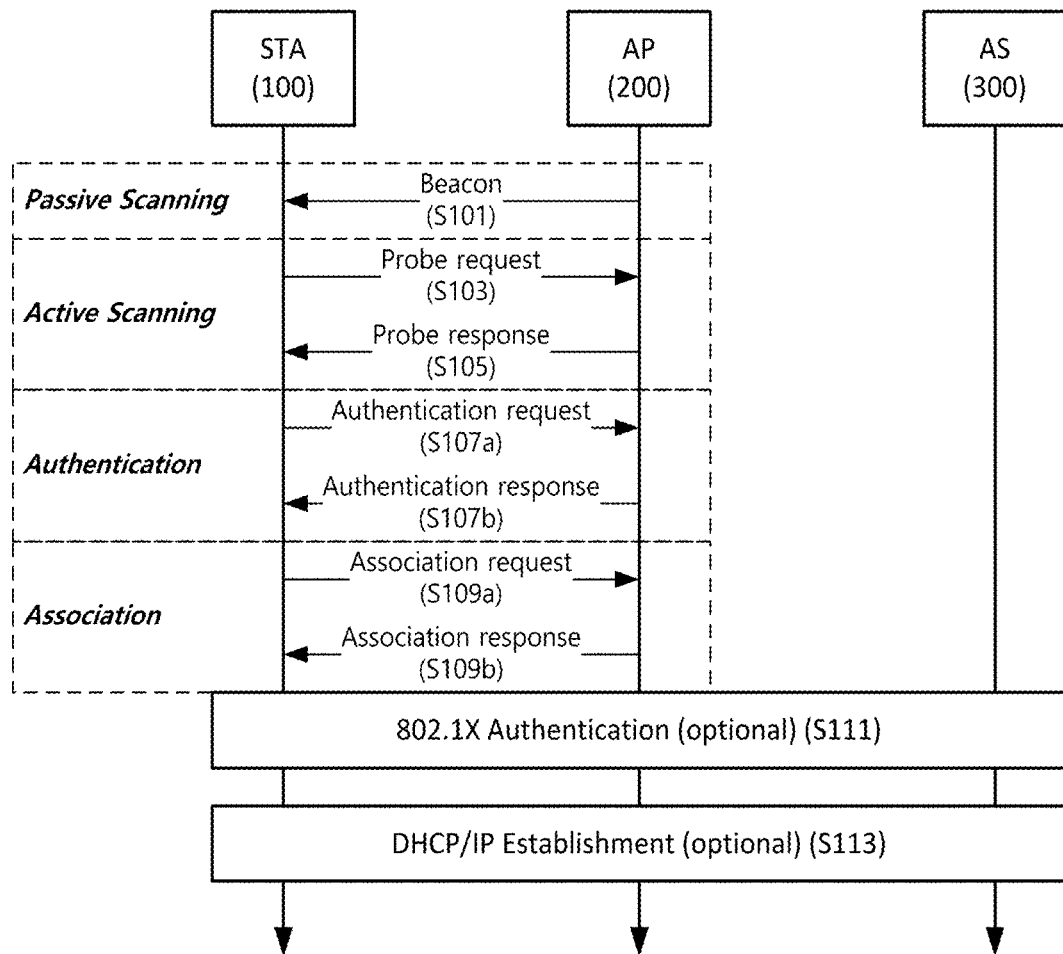
FIG. 5 is a view illustrating a process that a station sets an access point and a link according to an embodiment of the present invention.

FIG. 5 is a diagram schematically illustrating a process in which a STA sets a link with an AP.

Referring to FIG. 5, the link between the STA 100 and the AP 200 is set through three steps of scanning, authentication, and association in a broad way. First, the scanning step is a step in which the STA 100 obtains access information of BSS operated by the AP 200. A method for performing the scanning includes a passive scanning method in which the AP 200 obtains information by using a beacon message (S101) which is periodically transmitted and an active scanning method in which the STA 100 transmits a probe request to the AP (S103) and obtains access information by receiving a probe response from the AP (S105).

The STA 100 that successfully receives wireless access information in the scanning step performs the authentication step by transmitting an authentication request (S107a) and receiving an authentication response from the AP 200 (S107b). After the authentication step is performed, the STA 100 performs the association step by transmitting an association request (S109a) and receiving an association response from the AP 200 (S109b).

Meanwhile, an 802.1X based authentication step (S111) and an IP address obtaining step (S113) through DHCP may be additionally performed. In FIG. 5, the authentication server 300 is a server that processes 802.1X based authentication with the STA 100 and may be present in physical association with the AP 200 or present as a separate server.

When data is transmitted using Orthogonal Frequency Division Modulation or Multi Input Multi Output (MIMO), any one wireless communication terminal may transmit data to a plurality of wireless communication terminals simultaneously. Also, any one wireless communication terminal may simultaneously receive data from a plurality of wireless communication terminals. An embodiment of the present invention will be described through FIGS. 6 to 24, in which any one wireless communication terminal transmits data to a plurality of wireless communication terminals and a plurality of wireless communication terminals transmit data to any one wireless communication terminal. Especially, an embodiment of the present invention will be described in which a wireless communication terminal prevents other wireless communication terminals from accessing a channel and synchronizes data transmission.

For convenience of description, any one wireless communication terminal that communicates simultaneously with a plurality of wireless communication terminals is referred to as a first wireless communication terminal and a plurality of wireless communication terminals that simultaneously communicate with the first wireless communication terminal are referred to as a plurality of second wireless communication terminals. In addition, the first wireless communication terminal may be referred to as a base wireless communication terminal. In addition, the first wireless communication terminal may be a wireless communication terminal that allocates a communication medium resource and performs scheduling in communication with a plurality of wireless communication terminals. Specifically, the first wireless communication terminal may perform the role of a cell coordinator. At this time, the first wireless communication terminal may be the access point 200. In addition, the second wireless communication terminal may be the station 100 associated with the access point 200. In a specific embodiment, the first wireless communication terminal may be a wireless communication terminal that allocates a communication medium resource and performs scheduling in an independent network, such as an ad-hoc network, which is not connected to an external distribution service. In addition, the first wireless communication terminal may be at least one of a base station, an eNB, and a transmission point TP.

Figure 6:
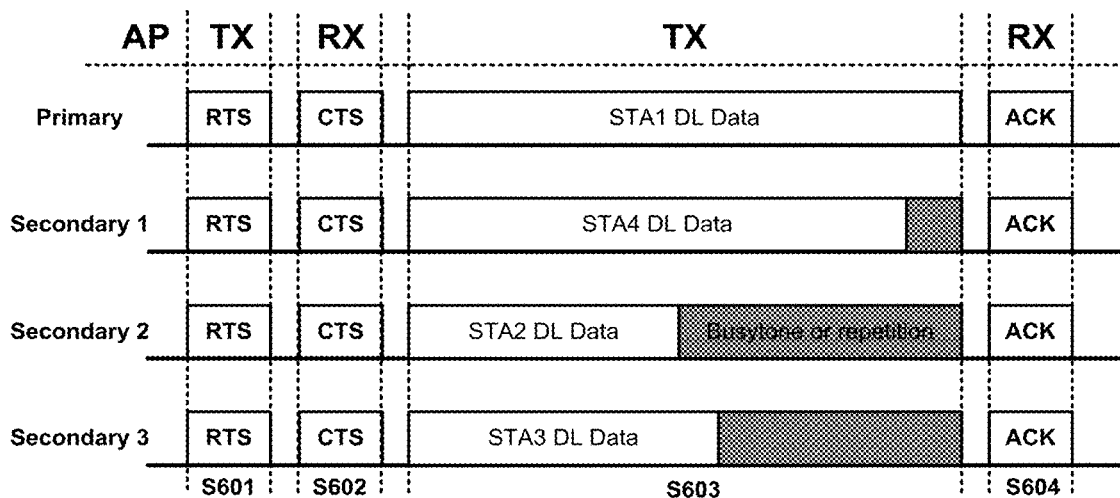
FIG. 6 is a view illustrating that an access point transmits data to a plurality of stations according to an embodiment of the present invention.

FIG. 6 is a view illustrating that an access point transmits data to a plurality of stations according to an embodiment of the present invention.

As described above, the first wireless communication terminal may transmit data to the plurality of second wireless communication terminals. At this time, the first wireless communication terminal may transmit data to each of the plurality of second wireless communication terminals through a channel allocated to each of the plurality of second wireless communication terminals. In addition, the first wireless communication terminal may transmit data to each of the plurality of second wireless communication terminals through a channel allocated to each of the plurality of second wireless communication terminals by using one radio frequency (RF)-chain. At this time, the sizes of data that the first wireless communication terminal transmits to the plurality of second wireless communication terminals may be all different. In such a case, the first wireless communication terminal may not change data transmission for any one second wireless communication terminal into a reception state until data transmission for all the plurality of second wireless communication terminals is completed. Therefore, the duration field value of a frame indicating that there is data transmitted from the first wireless communication terminal to the plurality of second wireless communication terminals may be a value based on data having the longest transmission time among data to be transmitted to each of the plurality of second wireless communication terminals. At this time, the duration field indicates a value used for setting a Network Allocation Vector (NAV).

When the data transmission of the first wireless communication terminal with respect to any one second wireless communication terminal among the plurality of second wireless communication terminals is completed, another wireless communication terminal not participating in the transmission may access a corresponding channel. In order to prevent this, the first wireless communication terminal may transmit dummy data to any one second wireless communication terminal that have completed transmission before data transmission for the plurality of second wireless communication terminals is all completed. At this time, the dummy data represents meaningless data that is distinguished from meaningful data transmitted through a data frame. Specifically, the dummy data may be a continuous pattern of a specific value such as "0". Specifically, the first wireless communication terminal may transmit data to the second wireless communication terminal after the transmission of a data frame. At this point, the data frame is a frame for transmitting data distinguished from a control frame. Specifically, the first wireless communication terminal may transmit dummy data after transmitting the FCS field of a data frame to the second wireless communication terminal. At this time, the second wireless communication terminal may ignore the dummy data. In a specific embodiment, the dummy data may be referred to as a busytone.

In another specific embodiment, the first wireless communication terminal may repeatedly transmit data to any one second wireless communication terminal that completes transmission before data transmissions for the plurality of second wireless communication terminals are all completed. At this point, the first wireless communication terminal may again transmit the same data frame to the second wireless communication terminal after the transmission of a data frame. Specifically, the first wireless communication terminal may transmit the same data frame again after transmitting the FCS field of a data frame to the second wireless communication terminal. At this time, the second wireless communication terminal may ignore the repeatedly transmitted data.

In the embodiment of FIG. 6, the access point AP transmits a Request To Send (RTS) frame indicating that there is data to be transmitted to the first station STA1, the second station STA2, the third station STA3, and the fourth station STA4 (S601). At this point, specifically, the access point AP transmits the RTS frame to the first station STA1 through a primary channel Primary. Also, the access point AP transmits the RTS frame to the fourth station STA4 through the first secondary channel Secondary 1. Additionally, the access point AP transmits the RTS frame to the second station STA2 through the second secondary channel Secondary 2. In addition, the access point AP transmits the RTS frame to the third station STA3 through the third secondary channel Secondary 3.

The first station STA1, the second station STA2, the third station STA3, and the fourth station STA4 transmit a Clear To Send (CTS) frame indicating ready to receive to the access point AP (S602). At this time, the duration field value of the CTS frame is based on the data transmission time for the first station STA1, which takes the largest transmission time.

The access point AP transmits data to the first station STA1, the second station STA2, the third station STA3, and the fourth station STA4 (S603). Specifically, the access point AP transmits data to the first station STA1 through a primary channel Primary. Additionally, the access point AP transmits data to the fourth station STA4 through the first secondary channel Secondary 1. Additionally, the access point AP transmits data to the second station STA2 through the second secondary channel Secondary 2. Additionally, the access point AP transmits data to the third station STA3 through the third secondary channel Secondary 3.

At this time, before completing transmission for the first station STA1, the access point AP completes data transmission for the second station STA2, the third station STA3, and the fourth station STA4. At this time, the access point AP transmits dummy data to the second station STA2, the third station STA3, and the fourth station, or transmits the previously transmitted data again.

The first station STA1, the second station STA2, the third station STA3, and the fourth station STA4 transmit an Acknowledgement (ACK) frame indicating whether data is received to the access point AP (S604). Specifically, after the data transmission of the access point AP for the first station STA1 is completed and then a predetermined time elapses, the first station STA1, the second station STA2, the third station STA3, and the fourth station STA4 transmit an ACK frame to the access point AP. At this time, the predetermined time may be a Short Inter-Frame Space (SIFS) defined in 802.11.

In the case of the above-described embodiment, the first wireless communication terminal may not receive data from the second wireless communication terminal or perform communication with another data communication terminal until data transmissions for all the second wireless communication terminals are completed. Accordingly, the processing ability and the currently usable frequency bandwidth of the first wireless communication terminal are wasted. This problem may be solved if the first wireless communication terminal independently uses each of plurality of RF-chains. This will be described with reference to FIGS. 7 to 9.

Figure 7:
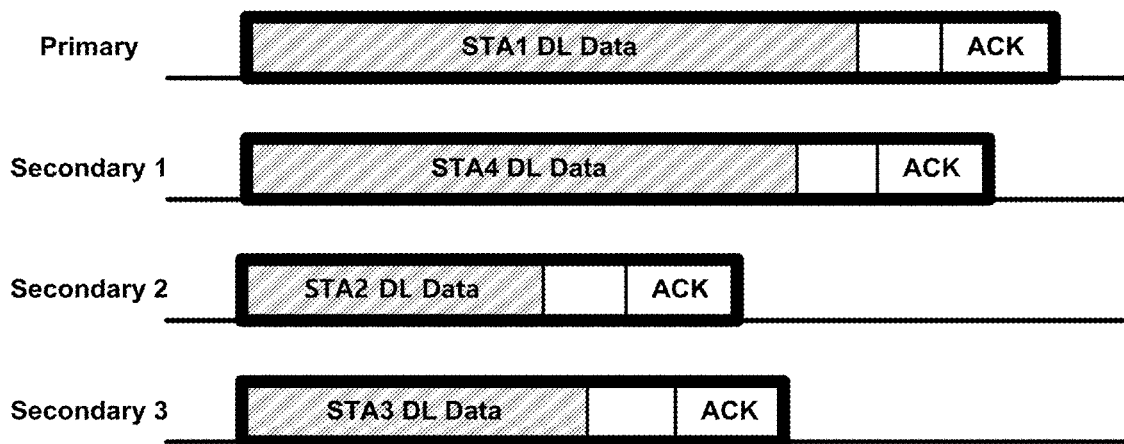
FIG. 7 is a view illustrating that an access point transmits data to each of a plurality of stations by independently using each of a plurality of RF-chains according to another embodiment of the present invention.

FIG. 7 is a view illustrating that an access point transmits data to each of a plurality of stations by independently using each of a plurality of RF-chains according to another embodiment of the present invention.

When using a plurality of RF-chains, a first wireless communication terminal may perform transmission and reception operations independently in a plurality of RF-chains. Accordingly, when the first wireless communication terminal allocates a plurality of RF-chains to a plurality of second wireless communication terminals, respectively, and performs communication, the first wireless communication terminal may receive a frame indicating whether data is received from the second wireless communication terminal whose data transmission is completed earlier than another second wireless communication terminal before transmission for the other second wireless communication terminal is completed. Therefore, it is possible to reduce the calculation burden of the first wireless communication terminal and maximize the frequency band utilization efficiency.

In the embodiment of FIG. 7, the access point AP uses four RF-chains that respectively use the primary channel Primary, the first secondary channel Secondary 1, the second secondary channel Secondary 2, and the third secondary channel Secondary 3. At this time, the access point AP allocates the four RF-chains to the first station STA1, the second station STA2, the third station STA3, and the fourth station STA4, respectively.

The access point AP transmits data to each of the first station STA1, the second station STA2, the third station STA3, and the fourth station STA4 independently. Specifically, after transmitting data to the second station STA2, the access point AP receives an ACK frame from the second station STA2 before data transmission for the first station STA1, the third station STA3, and the fourth station STA4 is completed. Then, after transmitting data to the third station STA3, the access point AP receives an ACK frame from the third station STA3 before data transmission for the first station STA1 and the fourth station STA4 is completed. Then, after transmitting data to the fourth station STA4, the access point AP receives an ACK frame from the third station STA3 before data transmission for the first station STA1 is completed. Then, after transmitting data to the first station STA1, the access point AP receives an ACK frame from the first station STA1.

Through such an operation, the first wireless communication terminal may return the used frequency band immediately.

In order to operate a plurality of RF-chains, a plurality of antennas should be used. Therefore, when the number of usable antennas is limited, the number of RF-chains that are able to be used by the first wireless communication terminal is limited. In addition, the number of channels that one first wireless communication terminal is able to simultaneously use may be limited. For example, according to the 802.11 AC standard, in a frequency band of 160 MHz, the first wireless communication terminal may use eight channels with a bandwidth of 20 MHz. In such a case, the first wireless communication terminal may use up to eight RF-chains. Therefore, a method for efficiently using the limited RF-chain is needed. This will be described with reference to FIG. 8.

Figure 8:
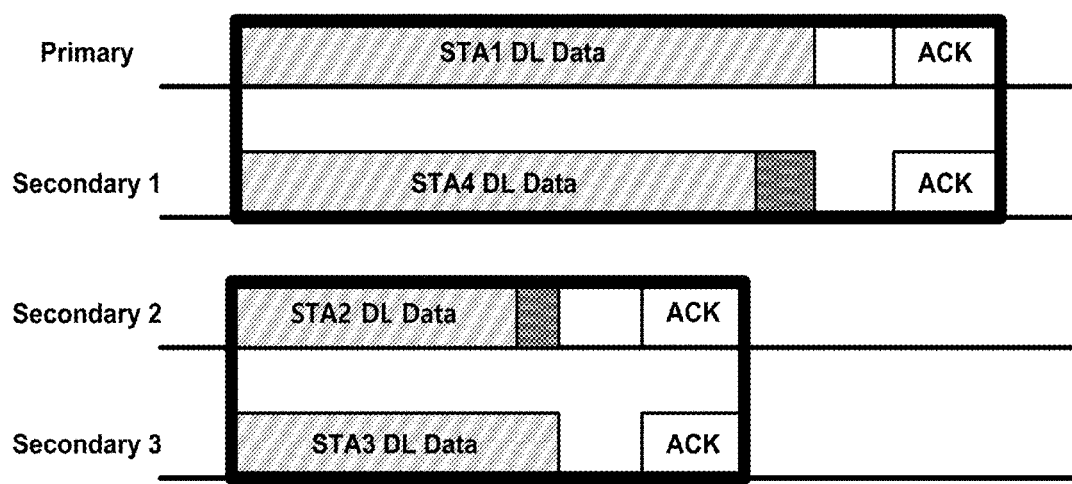
FIG. 8 is a view illustrating that an access point groups a plurality of stations into a plurality of groups and transmits data by independently allocating a plurality of RF-chains to the respective groups according to another embodiment of the present invention.

FIG. 8 is a view illustrating that an access point groups a plurality of stations into a plurality of groups and transmits data by independently allocating a plurality of RF-chains to the respective groups according to another embodiment of the present invention.

In order to efficiently use the limited RF-chain, the first wireless communication terminal may group a plurality of second wireless communication terminals into a plurality of groups, and allocate one RF-chain to one group including the plurality of second wireless communication terminals. At this time, the first wireless communication terminal may group the second wireless communication terminals based on a data transmission time required for each of the plurality of second wireless communication terminals. Specifically, the first wireless communication terminal may determine the plurality of second wireless communication terminals as one group when the time difference of a time required for transmitting data to each of the plurality of second wireless communication terminals is within a reference value. For example, the transmission time of data to be transmitted from the first wireless communication terminal to the first station, which is one of the second wireless communication terminals, is 20 ms, and the transmission time of data to be transmitted to the second station is 21 ms. At this time, a reference time value as a reference of grouping is 2 ms. In such a case, the first wireless communication terminal may determine the first station and the second station as one group. Then, the first wireless communication terminal may transmit data to the first station and the second station by allocating one RF-chain to the first station and the second station.

In another specific embodiment, the first wireless communication terminal may group the plurality of second wireless communication terminals based on the size of data to be transmitted to each of the plurality of second wireless communication terminals. Specifically, the first wireless communication terminal may determine the plurality of second wireless communication terminals as one group when the size difference of data to be transmitted to each of the plurality of second wireless communication terminals is within a reference value. For example, the size of data to be transmitted from the first wireless communication terminal to the first station, which is one of the second wireless communication terminals, is 210 Bytes, and the size of data to be transmitted to the second station is 220 Bytes. At this time, a reference size value as a reference of grouping is 5 Bytes. In such a case, the first wireless communication terminal may determine the first station and the second station as one group. Then, the first wireless communication terminal may transmit data to the first station and the second station by allocating one RF-chain to the first station and the second station.

At this time, the first wireless communication terminal may transmit data to each of the plurality of second wireless communication terminals belonging to one group through each of a plurality of channels that are not adjacent to each other. In such a case, the first wireless communication terminal may nullify a channel between two channels that are not adjacent to each other. For example, when frequency bands are divided in the order of a primary channel, a first secondary channel, a second secondary channel, and a third secondary channel, the first station and the second station included in the same group may use the primary channel and the second secondary channel, respectively. At this time, the first wireless communication terminal may nullify the first secondary channel.

In addition, the number of the second wireless communication terminals included in one group may not be limited. Accordingly, the number of the second wireless communication terminals included in each of the plurality of groups may be different from each other. For example, the number of the second wireless communication terminals included in the first group may be two, and the number of the second wireless communication terminals included in the second group may be four.

In the embodiment of FIG. 8, the access point AP groups the first station STA1, the second station STA2, the third station STA3, and the fourth station STA4 into two groups, and transmits data to each of the two groups by using an independent RF-chain.

Specifically, the access point AP determines the first station STA1 and the fourth station STA4, in which the transmission time (i.e., duration) of data to be transmitted has a difference within a reference value, as the first group. In addition, the access point AP determines the second station STA2 and the third station STA3, in which the transmission time (i.e., duration) of data to be transmitted has a difference within a reference value, as the second group. The access point AP allocates one RF-chain to each of the first group and the second group.

The access point AP transmits data to a station allocated to each group through the allocated RF-chain. Specifically, the access point AP transmits data to the first station STA1 and the fourth station STA4 through one RF-chain. At this time, the access point AP first completes the data transmission for the fourth station STA4 before the data transmission for the first station STA1. Thereafter, until the data transmission for the first station STA1 is completed, the access point AP transmits dummy data or transmits the transmitted data again through the first secondary channel Secondary 1 used for the data transmission for the fourth station STA4. In addition, the access point AP transmits data to the second station STA2 and the third station STA3 through one RF-chain. At this time, the access point AP first completes the data transmission for the second station STA2 before the data transmission for the third station STA3. Thereafter, until the data transmission for the third station STA3 is completed, the access point AP may transmit dummy data or transmit the transmitted data again through the third secondary channel Secondary 3 used for the data transmission for the third station STA3.

Through such an embodiment, the first wireless communication terminal may efficiently utilize the frequency band and the processing ability while using the limited number of RF-chains.

A wireless communication terminal may periodically occupy a channel according to a predetermined period. Such a channel access method may be referred to as a Point Coordination Function (PCF). In addition, if a corresponding channel is idle for a predetermined time or longer, the wireless communication terminal may use the corresponding channel through a contention procedure. Specifically, when a corresponding channel is idle for a predetermined time or longer, the wireless communication terminal obtains a random value within a predetermined contention window value. If a corresponding channel is idle after waiting for the obtained random value, the wireless communication terminal may use the corresponding channel. At this time, the predetermined time may be a Distributed Inter-Frame Space (DIFS) or an Arbitration Inter-Frame Space (AIFS) defined by 802.11. Such a channel access method may be referred to as a Distributed Coordination Function (DCF). The wireless communication terminal may selectively use the PCF and the DCF based on the characteristics of the communication traffic between the wireless communication terminals. However, when the wireless communication terminal uses DCF and PCF alternately while using one RF-chain, the wireless connection efficiency may be lowered.

In addition, when independently using a plurality of RF-chains, the wireless communication terminal may access a channel by using the PCF with respect to any one RF-chain among the plurality of RF-chains, and access a channel by using the DCF with respect to another RF-chain. In such a case, unlike the case of using one RF-chain, the wireless connection efficiency of the wireless communication terminal may be increased. This will be described with reference to FIG. 9.

Figure 9:
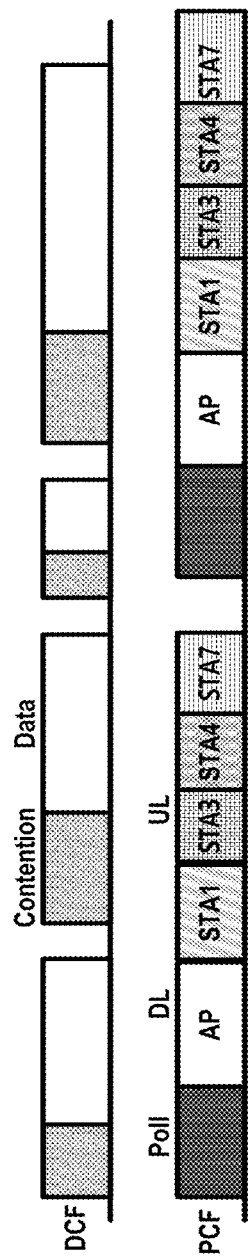
FIG. 9 is a view illustrating that an access point transmits data to a plurality of stations through different access methods for each of a plurality of RF-chains according to another embodiment of the present invention.

FIG. 9 is a view illustrating that an access point transmits data to a plurality of stations through different access methods for each of a plurality of RF-chains according to another embodiment of the present invention.

The first wireless communication terminal may transmit data to the plurality of second wireless communication terminals by varying a channel access method of each of the plurality of RF-chains. Specifically, the first wireless communication terminal may occupy a channel according to a predetermined period, with respect to a channel included in the first RF-chain among the plurality of RF-chains. Then, with respect to a channel included in the second RF-chain, the first wireless communication terminal may detect whether a corresponding channel is idle and occupy a channel through a contention procedure. In a specific embodiment, in the case of a channel included in the first RF-chain among the plurality of RF-chains, the first wireless communication terminal may occupy the channel through the PCF and in the case of a channel included in the second RF-chain, occupy the channel through the DCF.

Additionally, the first wireless communication terminal may transmit data to the plurality of second wireless communication terminals by varying a channel access method of each of the plurality of RF-chains based on the traffic characteristics transmitted through the plurality of RF-chains. Specifically, the first wireless communication terminal may transmit data to the plurality of second wireless communication terminals by varying a channel access method of each of the plurality of RF-chains according to the traffic class of the second wireless communication terminal connected through the RF-chain. For example, for an RF-chain that connects a second wireless communication terminal having a traffic class with a priority that is higher than that of the traffic class of a second wireless communication terminal connected by another RF-chain, the first wireless communication terminal may occupy the channel of a corresponding RF-chain through a contention procedure. In addition, for an RF-chain that connects a second wireless communication terminal having a traffic class with a priority that is lower than that of the traffic class of a second wireless communication terminal connected by another RF-chain, the first wireless communication terminal may occupy the channel of a corresponding RF-chain periodically.

In the embodiment of FIG. 9, an access point AP communicates with a plurality of stations using two RF-chains. The access point AP occupies a channel through the DCF with respect to a channel included in the first RF-chain. Therefore, the access point AP occupies a channel through a contention procedure with respect to a channel included in the first RF-chain, and transmits data. In addition, the access point AP occupies a channel through the PCF with respect to a channel included in the second RF-chain. Therefore, the access point AP occupies a channel according to a predetermined period with respect to a channel included in the second RF-chain, and transmits data. In the embodiment of FIG. 9, the access point AP first occupies a channel included in the second RF-chain and transmits data. Then, in the order of the first station STA1, the third station STA3, the fourth station STA4, and seventh station STAT occupies a channel included in the second RF-chain and transmits the data.

Through such an embodiment, the first wireless communication terminal may increase the efficiency of a channel access and data transmission.

Through FIGS. 7 to 9, an embodiment using a plurality of RF-chains independently is described above. Through this, even when the first wireless communication terminal has a different time required to transmit data to each of the plurality of second wireless communication terminals, the amount of processing of the first wireless communication terminal and the second wireless communication terminal may be reduced. In addition, through this, the frequency band may be utilized efficiently. Through FIGS. 10 to 13, even when the first wireless communication terminal has a different time required to transmit data to each of the plurality of second wireless communication terminals, another embodiment for reducing the amount of computation of the first wireless communication terminal and the second wireless communication terminal and efficiently utilizing a frequency band is described.

Figure 10:
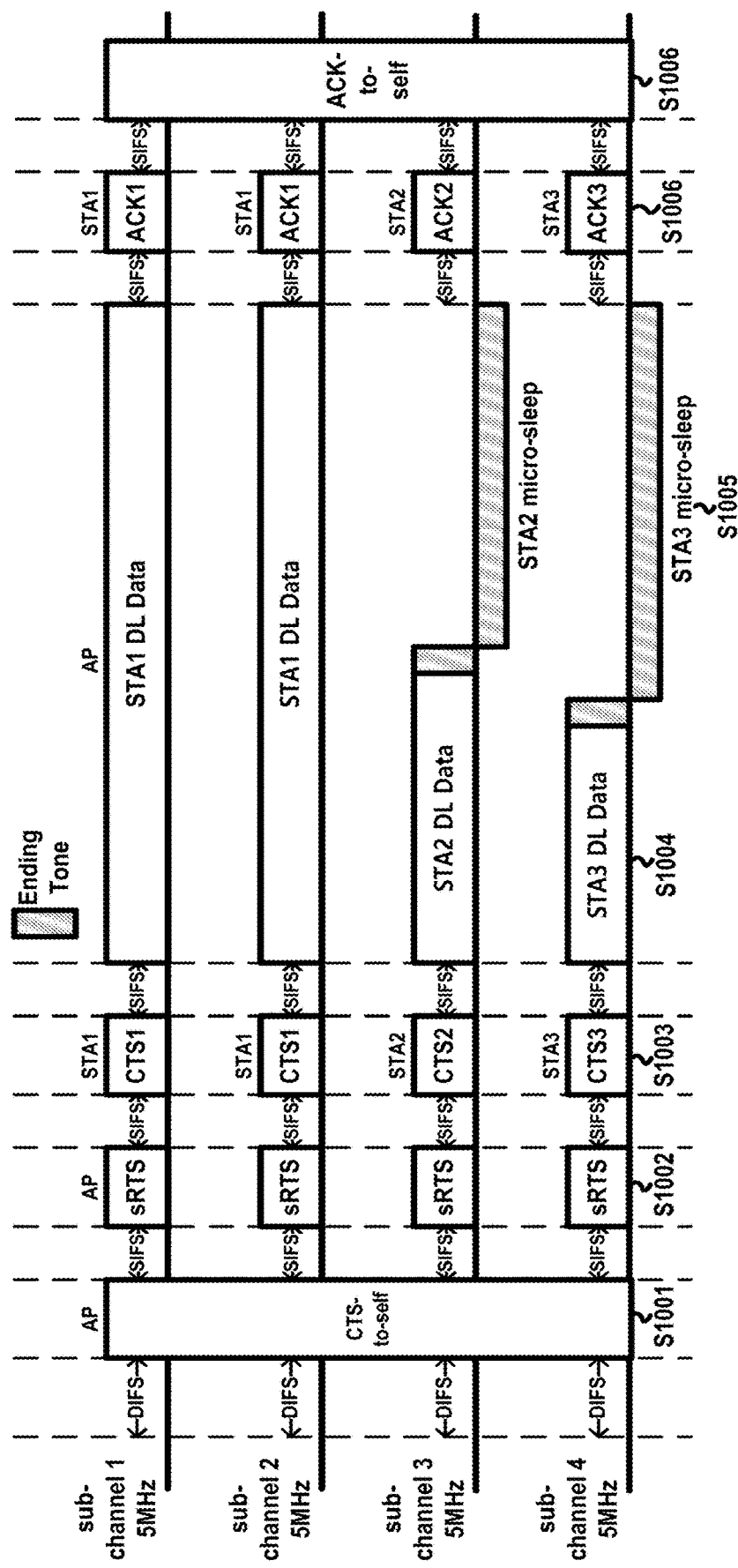
FIG. 10 is a view illustrating that, when an access point transmits data to a plurality of stations, a station that receives data first among the plurality of stations performs microsleep according to an embodiment of the present invention.

FIG. 10 is a view illustrating that, when an access point transmits data to a plurality of stations, a station that receives data first among the plurality of stations performs microsleep according to an embodiment of the present invention.

The first wireless communication terminal transmits a frame indicating a channel allocated to the second wireless communication terminal to the second wireless communication terminal. The duration field value of a frame indicating the channel allocated to the second wireless communication terminal may be a value based on data having the longest transmission time among data to be transmitted to each of the plurality of second wireless communication terminals. At this time, the duration field indicates a value used for setting a Network Allocation Vector (NAV). However, when the first wireless communication terminal transmits a CTS-to-Self frame to be described later, the duration field value of the frame indicating the channel allocated to the second wireless communication terminal may be determined based on a time required for transmitting data to each second wireless communication terminal that receives the frame.

In a specific embodiment, the first wireless communication terminal may transmit a frame indicating a channel allocated to the second wireless communication terminal through a channel allocated to each of the plurality of second wireless communication terminals. At this time, the frame indicating the channel allocated to the second wireless communication terminal may indicate a time point at which data is transmitted to the second wireless communication terminal. A frame indicating a channel allocated to the second wireless communication terminal may be referred to as an sRTS frame. The specific format of the sRTS frame will be described later with reference to FIG. 12.

In addition, the channel allocated to the second wireless communication terminal may be a channel and also a sub-channel that is the sub-band of the channel. In such a case, the first wireless communication terminal may transmit the sRTS frame through the sub-channel allocated to the second wireless communication terminal.

Before this, the first wireless communication terminal may transmit a CTS-to-Self frame in which the reception address of a frame indicating ready to receive data is the address of a wireless communication terminal that transmits a corresponding frame. Specifically, the first wireless communication terminal may transmit a CTS-to-Self frame through a channel having a sub-channel as a sub-band. Through this, the first wireless communication terminal does not support the embodiment of the present invention, thereby preventing wireless communication terminals from accessing a channel through a sub-channel. Specifically, when the first wireless communication terminal transmits a frame indicating a channel allocated to the second wireless communication terminal to the second wireless communication terminal through a sub-channel, the wireless communication terminal that monitors only the 20 MHz channel may not receive the frame. Accordingly, the first wireless communication terminal may transmit a CTS-to-Self frame before transmitting a frame indicating the channel allocated to the second wireless communication terminal. Through this, the first wireless communication terminal may allow a wireless communication terminal that monitors only the 20 MHz channel to set the NAV. The value of the duration field of the CTS-to-Self frame may be determined based on the longest time required to transmit data to each of the plurality of second wireless communication terminals.

The second wireless communication terminal that receives the frame indicating the channel allocated to the second wireless communication terminal transmits a frame indicating ready to receive data to the first wireless communication terminal. Specifically, the second wireless communication terminal transmits to the first wireless communication terminal a frame indicating ready to receive data through the channel allocated to the second wireless communication terminal. At this time, the frame indicating ready to receive data may be a CTS frame.

The first wireless communication terminal transmits data to the second wireless communication terminal based on the frame indicating ready to receive the data. At this time, the first wireless communication terminal may transmit data to the second wireless communication terminal and transmit information indicating that the data transmission is completed to the second wireless communication terminal. In such a case, the second wireless communication terminal may enter a sleep mode based on the information indicating that the data transmission is completed. At this time, the sleep mode indicates that a wireless communication terminal performs only a certain function in order to reduce power consumption. Specifically, the second wireless communication terminal may enter a sleep mode when receiving the information indicating that the data transmission is completed. In addition, the second wireless communication terminal may maintain the sleep mode for a time obtained by subtracting the elapsed time from the duration field value of the frame indicating the channel allocated to the second wireless communication terminal or the duration field value of the CTS-to-Self frame.

The information indicating that the transmission is terminated may be predefined. Additionally, the information indicating that the transmission is terminated may have a repeated specific pattern. Specifically, the information indicating that the transmission is terminated may be similar to the auto-detection pattern of the preamble of 802.11ac. In a specific embodiment, the information indicating that the transmission is terminated may be referred to as an ending-tone.

In another specific embodiment, without the information indicating that the transmission is terminated, the second wireless communication terminal may enter the sleep mode after a lapse of time corresponding to the duration field value of the frame indicating the channel allocated to the second wireless communication terminal. In such a case, the duration field value of the frame indicating the channel allocated to the second wireless communication terminal indicates the time required for transmitting data to be transmitted to the second wireless communication terminal.

In another specific embodiment, the second wireless communication terminal may enter the sleep mode based on information indicating the number of symbols of data included in the preamble of a signal including data. Specifically, the second wireless communication terminal may receive data as many as the number of symbols indicated by the information indicating the number of symbols of data, and enter the sleep mode. At this time, the preambles of all signals transmitted by a sub-channel unit may include information indicating the number of symbols of data. At this time, the information indicating the number of symbols of data included in the preamble of the signal may be referred to as a length field.

When data transmission to all of the plurality of second wireless communication terminals is completed, the second wireless communication terminal entering the sleep mode may wake-up. Specifically, the second wireless communication terminal may wake up after a predetermined time elapses from the time when the second wireless communication terminal enters the sleep mode. At this time, the predetermined time may be a time indicated by the duration field value of a frame indicating a channel allocated to the second wireless communication terminal, or a time obtained by subtracting an elapsed time from the duration field value of a CTS-to-Self frame.

The plurality of second wireless communication terminals transmit to the first wireless communication terminal a frame indicating whether data is received or not. Specifically, the plurality of second wireless communication terminals may transmit to the first wireless communication terminal a frame indicating whether data is received through a channel allocated to each of the plurality of second wireless communication terminals. At this point, the frame indicating whether data is received may be an ACK frame.

In addition, after receiving a frame indicating whether data is received from the second wireless communication terminal, the first wireless communication terminal may transmit an ACK-to-Self frame. At this time, the ACK-to-Self frame indicates an ACK frame indicating that the reception address is the first wireless communication terminal that transmits the ACK-to-Self frame. Specifically, when transmitting data through a sub-channel, the first wireless communication terminal may transmit the ACK-to-Self frame through the channel having a corresponding sub-channel as a sub-band. For example, the first wireless communication terminal may transmit data through a sub-channel having a bandwidth of 5 MHz, which is a sub-channel of a channel having a bandwidth of 20 MHz, and may receive a frame indicating whether data is received through a corresponding sub-channel. At this time, the first wireless communication terminal may transmit an ACK-to-Self frame through a channel having a bandwidth of 20 MHz. Through this, compatibility with a wireless communication terminal that does not support an embodiment of the present invention and does not monitor a sub-channel may be achieved. Also, when the first wireless communication terminal transmits data through the sub-channel, the duration field value of a control frame transmitted through a channel unit may be the duration until the ACK-to-Self frame is transmitted. At this time, the control frame may include a CTS-to-Self frame.

In the embodiment of FIG. 10, the access point AP transmits a CTS-to-Self frame through a channel having a bandwidth of 20 MHz (S1001). Through this, the access point AP may allow a station that does not support an embodiment of the present invention to set a NAV.

The access point AP transmits a sRTS frame including information indicating a channel allocated to each of the plurality of stations to the first station STA1, the second station STA2, and the third station STA3 (S1002). Specifically, the access point AP transmits a sRTS frame to the first station STA1, the second station STA2, and the third station STA3 through a channel allocated to each of the first station STA1, the second station STA2, STA2, and the third station STA3. At this time, the channel allocated to each of the first station STA1, the second station STA2, and the third station STA3 is a sub-channel of a channel having a bandwidth of 20 MHz. Specifically, the sub-channel may have a bandwidth of 5 MHz.

The first station STA1, the second station STA2, and the third station STA3 obtain information on a channel allocated to each of the first station STA1, the second station STA2, the third station STA3, and the fourth station STA4, based on an sRTS frame. Specifically, the first station STA1 obtains information indicating that a first sub-channel sub-channel 1 and a second sub-channel sub-channel 2 are allocated to the first station STA1. In addition, the second station STA2 obtains information indicating that a sub-channel 3 is allocated to the second station STA2. In addition, the third station STA3 obtains information indicating that a fourth sub-channel sub-channel 4 is allocated to the second station STA2.

The first station STA1, the second station STA2, and the third station STA3 transmit a CTS frame indicating ready to receive data through a channel allocated to each of the first station STA1, the second station STA2, and the third station STA3 (S1003).

The access point AP receives the CTS frame indicating ready to receive data.

The access point AP transmits data to each of the first station STA1, the second station STA2, and the third station STA3 based on the CTS frame indicating ready to receive data (S1004). Specifically, the access point AP transmits data to each of the first station STA1, the second station STA2, and the third station STA3, which transmit the CTS frame. At this time, the access point AP completes the data transmission for the second station STA2 and the third station STA3 before the data transmission for the first station STA1 is completed. The access point AP transmits an ending tone, which is information indicating that the data transmission for the second station STA2 and the third station STA3 is terminated.

The second station STA2 and the third station STA3 receive data and perform a micro-sleep mode based on an ending tone, which is information indicating that data transmission is terminated (S1005). The second station STA2 and the third station STA3 may wake up based on the duration field value included in the CTS-to-Self frame or the sRTS frame as described above. Specifically, after entering the sleep mode, the second station STA2 and the third station STA3 may wake up after a time obtained by subtracting an elapsed time from a time of receiving a CTS-to-S elf frame to a time of completing data transmission from the duration field value included in the CTS-to-Self. In another specific embodiment, after entering the sleep mode, the second station STA2 and the third station STA3 may wake up after a time of completing data transmission from a time of receiving an sRTS frame in the duration field value included in the sRTS frame.

The first station STA1, the second station STA2, and the third station STA3, which receive data, transmit to the access point AP an ACK frame indicating whether data is received through a channel allocated to each of the first station STA1, the second station STA2, and the third station STA3. At this time, since receiving allocated sub-channels, the first station STA1, the second station STA2, and the third station STA3 transmit an ACK frame through a sub-channel allocated to each of the first station STA1, the second station STA2, and the third station STA3.

The access point AP transmits an ACK-to-Self frame, which is an ACK frame having the reception address of the access point AP, through a channel having a bandwidth of 20 MHz. Through this, the access point AP notifies that the transmission of a wireless communication terminal that does not support an embodiment of the present invention is terminated.

Through such an embodiment, a second wireless communication terminal that first completes data reception among the plurality of second wireless communication terminals enters the sleep mode so that it may reduce the power consumption. However, through such an embodiment, a channel allocated to the second wireless communication terminal is not used while the second wireless communication terminal enters the sleep mode. Therefore, there is a need for a method for utilizing a channel allocated to the second wireless communication terminal when the data transmission for the second wireless communication terminal is completed and the second wireless communication terminal enters the sleep mode. This will be described with reference to FIG. 11.

Figure 11:
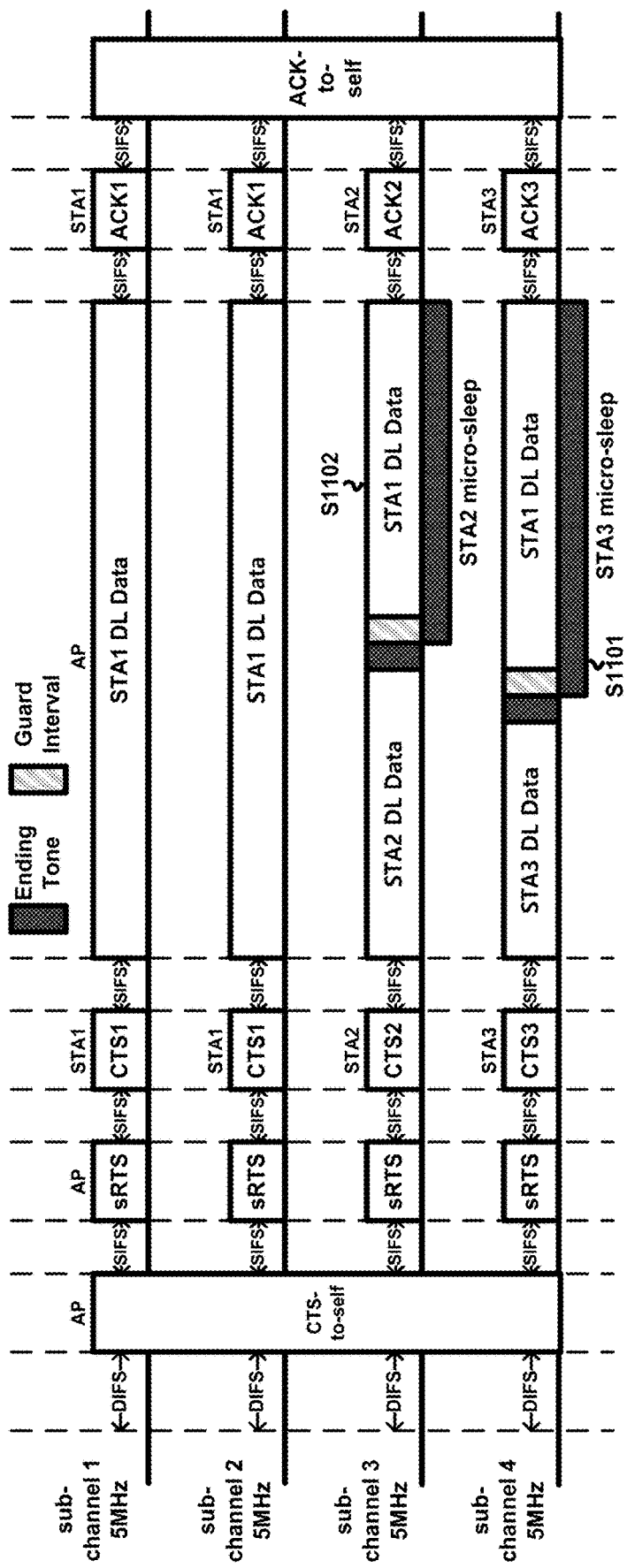
FIG. 11 is a view illustrating that, when an access point transmits data to a plurality of stations, data is transmitted to another station by using a channel allocated to a station that receives data first among the plurality of stations according to an embodiment of the present invention.

FIG. 11 is a view illustrating that, when an access point transmits data to a plurality of stations, data is transmitted to another station by using a channel allocated to a station that receives data first among the plurality of stations according to an embodiment of the present invention.

While transmitting data to the plurality of second wireless communication terminals, the first wireless communication terminal may first complete the data transmission for any one of the plurality of second wireless communication terminals. In such a case, the first wireless communication terminal may transmit data to another second wireless communication terminal whose data transmission is not completed through a channel allocated to any one second wireless communication terminal whose data transmission is completed. At this time, another second wireless communication terminal may be a second wireless communication terminal whose data transmission is not completed among a plurality of second wireless communication terminals. In another specific embodiment, another second wireless communication terminal may be a second wireless communication terminal that does not start to receive data when the data transmission for any one second wireless communication terminal is completed.

In addition, as described above, while transmitting data to the plurality of second wireless communication terminals, the first wireless communication terminal may transmit information indicating that the data transmission is completed to a second wireless communication terminal whose data transmission is completed first among the plurality of second wireless communication terminals. After transmitting the information indicating that the data transmission is completed, the first wireless communication terminal may transmit data to another second wireless communication terminal through a channel allocated to a second wireless communication terminal whose data transmission is completed first among the plurality of second wireless communication terminals.

At this time, the first wireless communication terminal may transmit a guard interval signal before transmitting data after transmitting the information indicating that the data transmission is completed in order to prevent interference between signals. At this time, the guard interval signal may be a Nulling signal.

As described above, the first wireless communication terminal may transmit a frame indicating a channel allocated to the second wireless communication terminal. At this time, a frame indicating a channel allocated to the second wireless communication terminal may indicate that data is transmitted to another second wireless communication terminal through a channel allocated to a second wireless communication terminal whose data transmission is completed first among the plurality of second wireless communication terminals. A structure of a frame indicating a channel allocated to the second wireless communication terminal for this will be described later with reference to FIG. 12.

In the embodiment of FIG. 11, the access point AP transmits data to the first station STA1, the second station STA2, and the third station STA3. At this time, the remaining operations of the access point AP except for the operation of transmitting data to the first station STA1, the second station STA2, and the third station STA3 are the same as those of the embodiment of FIG. 10. Therefore, it will be described that the access point AP transmits data to the first station STA1, the second station STA2, and the third station STA3, and a description of other operations will be omitted.

The access point AP transmits data to each of the first station STA1, the second station STA2, and the third station STA3 based on the CTS frame indicating ready to receive data. Specifically, the access point AP transmits data to each of the first station STA1, the second station STA2, and the third station STA3, which transmit the CTS frame. At this time, the access point AP completes the data transmission for the second station STA2 and the third station STA3 before the data transmission for the first station STA1 is completed. The access point AP transmits an ending tone, which is information indicating that the data transmission is terminated, to the second station STA2 and the third station STA3. At this time, the second station STA2 and the third station STA3 receive data and perform a micro-sleep mode based on an ending tone, which is information indicating that data transmission is terminated (S1101). The subsequent operation of the second station STA2 and the third station STA3 may be the same as the above-described embodiments.

The access point AP transmits data to the first station STA1 through a channel allocated to the second station STA2 and the third station STA3 (S1102). Specifically, the access point AP transmits an ending tone to the second station STA2 and the third station STA3 through a channel allocated to the second station STA2 and the third station STA3, and transmits a guard interval signal. After transmitting the guard interval signal, the access point AP transmits data to the first station STA1 through a channel allocated to the second station STA2 and the third station STA3.

Through this, the first wireless communication terminal may increase the usage efficiency of a frequency band.

Figure 12:
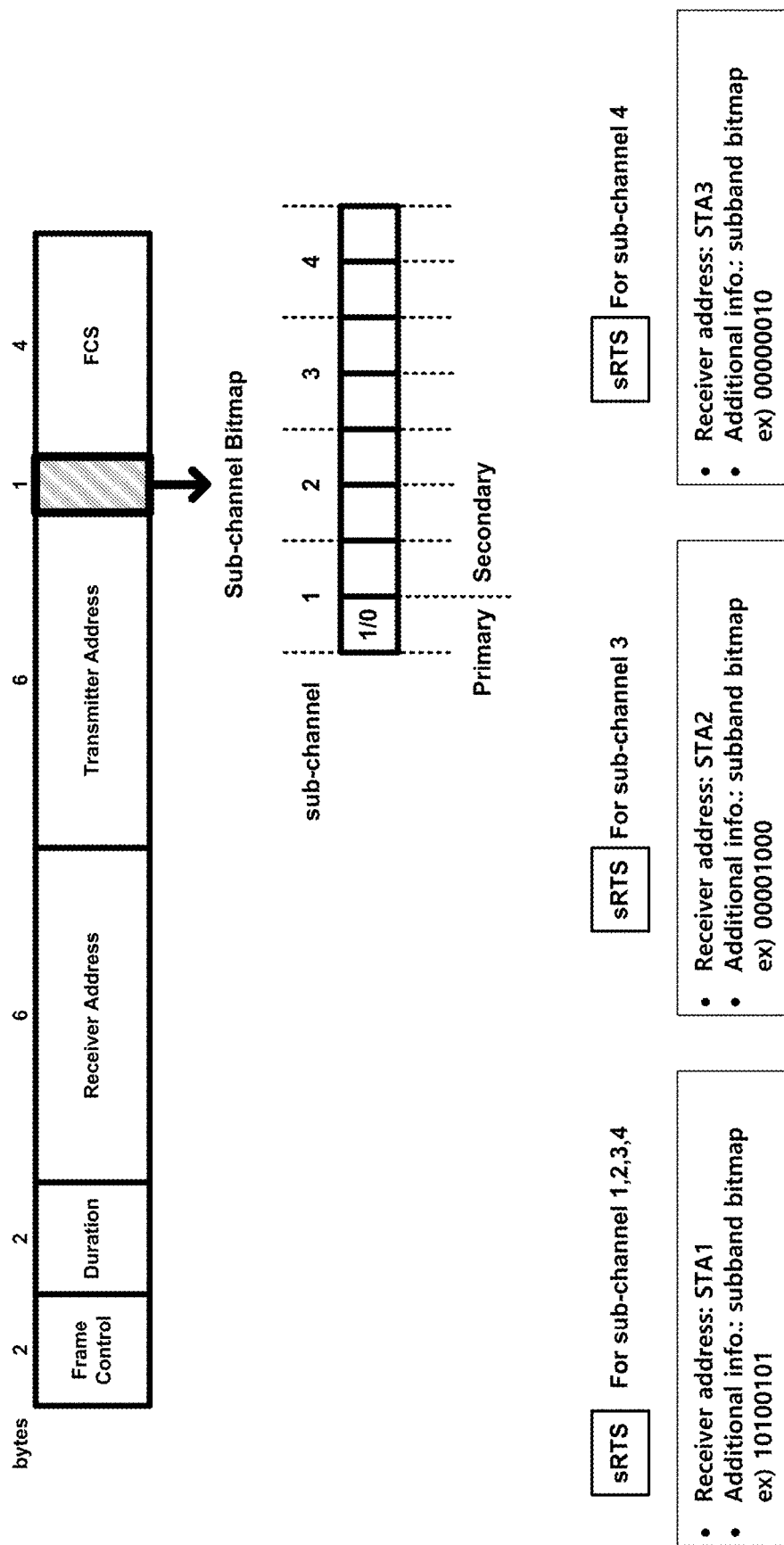
FIG. 12 is a view illustrating the format of a frame indicating a channel allocated to a wireless communication terminal according to an embodiment of the present invention.

FIG. 12 is a view illustrating the format of a frame indicating a channel allocated to a wireless communication terminal according to an embodiment of the present invention.

The frame indicating a channel allocated to the second wireless communication terminal may include information on a channel allocated to the second wireless communication terminal. At this time, the channel allocated to the second wireless communication terminal may be a channel and also a sub-channel that is the sub-band of the channel.

In addition, the frame indicating the channel allocated to the second wireless communication terminal may include information on the order in which the second wireless communication terminal uses the allocated channel. In a specific embodiment, the frame indicating the channel allocated to the second wireless communication terminal may include information that a corresponding second wireless communication terminal uses the allocated channel firstly or secondly. At this time, the information on whether the allocated channel is used firstly or secondly by a corresponding second wireless communication terminal may be in a 1-bit flag format. As described above, in a specific embodiment, the frame indicating the channel allocated to the second wireless communication terminal may be referred to as an sRTS frame.

In a specific embodiment as shown in FIG. 12, the sRTS frame may include a Frame Control field indicating information for frame control.

In addition, the sRTS frame may include a Duration field indicating information for NAV setting.

In addition, the sRTS frame may include a Receiver Address field indicating information for identifying the second wireless communication terminal that receives a corresponding frame. At this time, the information for identifying the second wireless communication terminal may be a association identifier for identifying the association of the first wireless communication terminal and the second wireless communication terminal. Specifically, the association identifier may be an AID. In another specific embodiment, the information for identifying the second wireless communication terminal may be a MAC address.

In addition, the sRTS frame may include a Transmitter Address field indicating information for identifying the second wireless communication terminal that transmits a corresponding frame. At this time, the information for identifying the first wireless communication terminal may indicate the MAC address of a wireless communication terminal. Further, the information for identifying the first wireless communication terminal may be an identifier for identifying a BSS included in the first wireless communication terminal.

In addition, the sRTS frame may include a Sub-channel Bitmap field indicating a sub-channel allocated to the second wireless communication terminal. At this time, the Sub-channel Bitmap field may include information indicating whether or not each of the plurality of sub-channels is allocated and the order in which a corresponding second wireless communication terminal uses the sub-channel. Specifically, the Sub-channel Bitmap field may include a field indicating each of a plurality of sub-channels. In addition, the field indicating each sub-channel may include a field indicating the order in which the second wireless communication terminal that receives an allocated corresponding sub-channel uses a corresponding sub-channel. Specifically, the field indicating the sub-channel may include a field indicating whether the second wireless communication terminal that receives an allocated corresponding sub-channel uses a corresponding sub-channel firstly or secondly. For example, the field representing each of the sub-channels may be a 2-bit field. At this time, the first bit of the field indicating each of the sub-channels may be a flag bit indicating that the second wireless communication terminal that receives an allocated corresponding sub-channel uses a corresponding sub-channel firstly. In addition, the second bit of the field indicating each of the sub-channels may be a flag bit indicating that the second wireless communication terminal that receives an allocated corresponding sub-channel uses a corresponding sub-channel secondly. In the embodiment of FIG. 12, the first station STA1 uses a first sub-channel sub-channel 1 and a second sub-channel sub-channel 2 firstly and uses a third sub-channel sub-channel 3 and a fourth sub-channel sub-channel 4 secondly. In such a case, the value of the Sub-channel Bitmap field is binary 10100101. Also, the second station STA2 uses the third sub-channel sub-channel 3 firstly. In such a case, the value of the Sub-channel Bitmap field is binary 00001000. Also, the third station STA3 uses the fourth sub-channel sub-channel 4 firstly. In such a case, the value of the Sub-channel Bitmap field is binary 00000010.

In the case that among the plurality of second wireless communication terminals, a second wireless communication terminal completes transmission and then immediately transmits a frame indicating whether data is received, a corresponding second wireless communication terminal may continuously maintain the sleep mode without waking up to transmit an ACK frame. However, since the first wireless communication terminal is transmitting data to another second wireless communication terminal, there is a problem that the first wireless communication terminal is not able to receive the frame indicating whether data is received. An embodiment of the present invention for solving the problem will be described with reference to FIG. 13 to FIG. 15.

Figure 13:
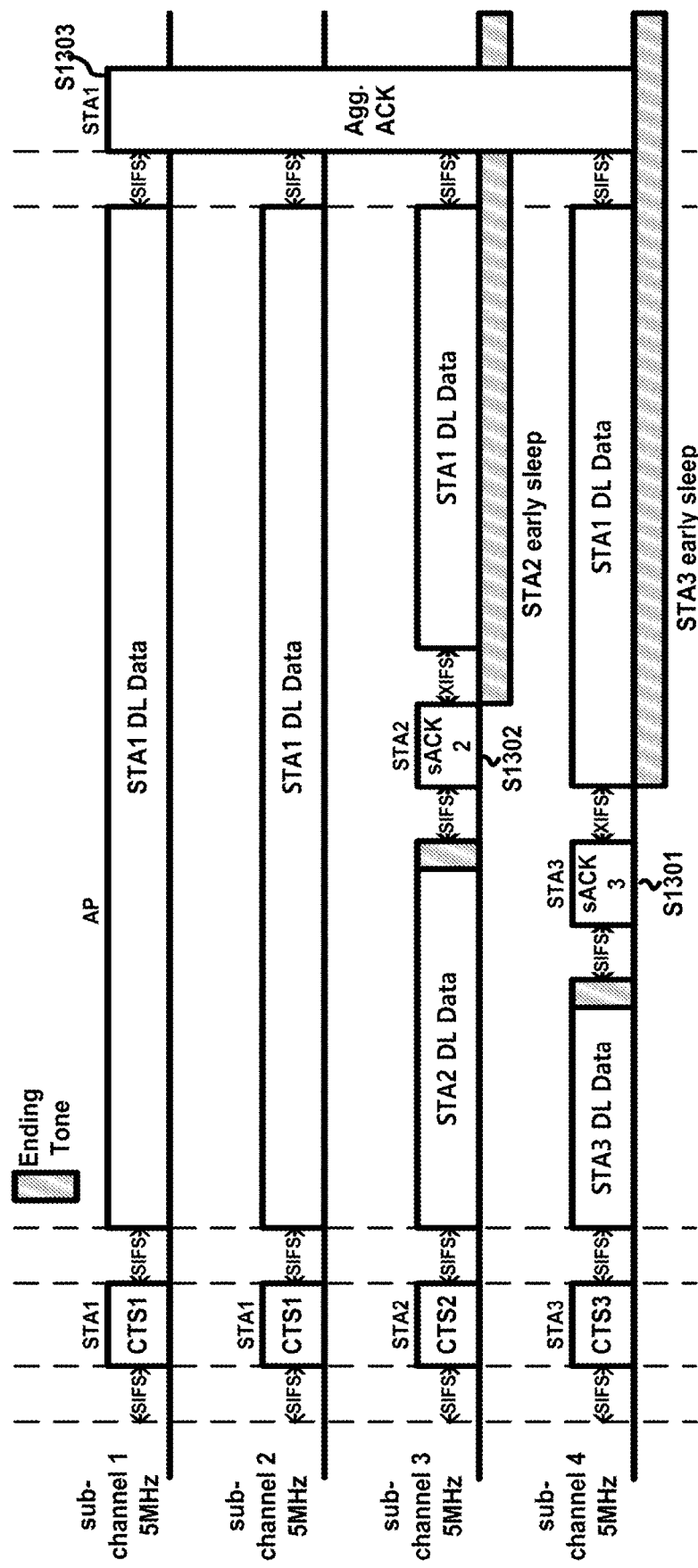
FIG. 13 is a view illustrating that when transmitting data to a plurality of stations, an access point receives a frame indicating whether data of the plurality of stations is received according to an embodiment of the present invention.

FIG. 13 is a view illustrating that when transmitting data to a plurality of stations, an access point receives a frame indicating whether data of the plurality of stations is received according to an embodiment of the present invention.

Even if receiving data through a sub-channel, a wireless communication terminal using a communication method with OFDMA receives a signal transmitted through an entire band of a channel having a sub-channel as a sub-band. Then, the wireless communication terminal detects data transmitted through the sub-channel allocated to the wireless communication terminal from the received signal. For example, a wireless communication terminal may receive an allocated sub-channel having a 5 MHz bandwidth of a channel having a 20 MHz bandwidth and receive data through a corresponding sub-channel. At this time, the wireless communication terminal receives a signal transmitted through the entire 20 MHz band. Then, the wireless communication terminal extracts the data, which is transmitted through the sub-channel allocated to the wireless communication terminal, from the signal of the entire 20 MHz band. Accordingly, the second wireless communication terminal, which is receiving data from the first wireless communication terminal, may receive a frame that another second wireless communication terminal transmits through a sub-channel not used by the first wireless communication terminal. Therefore, the second wireless communication terminal that completes data reception firstly among the plurality of second wireless communication terminals may transmit a frame indicating whether the second wireless communication terminals receives data to another second wireless communication terminal. Specifically, the second wireless communication terminal may transmit a frame indicating whether the second wireless communication terminal receives data to another wireless communication terminal through a channel allocated to the second wireless communication terminal. At this time, another second wireless communication terminal may be a second wireless communication terminal that currently receives data. In addition, a frame indicating whether data is received or not may be referred to as an sACK.

After all the data transmissions for the plurality of second wireless communication terminals are completed, another second wireless communication terminal transmits a frame indicating whether the plurality of second wireless communication terminals receive data. Specifically, another second wireless communication terminal may transmit a frame indicating whether the plurality of second wireless communication terminals receive data through a channel having a sub-channel allocated to the second wireless communication terminal as a sub-band. At this time, a frame indicating whether the plurality of second wireless communication terminals receive data may be referred to as an aggregated (Agg) ACK.

In the embodiment of FIG. 13, the first station STA1, the second station STA2, and the third station STA3 transmit a CTS frame indicating ready to receive data through a channel allocated to each of the first station STA1, the second station STA2, and the third station STA3. Specifically, the first station STA1 transmits a CTS frame to the access point AP through each of the first sub-channel sub-channel 1 and the second sub-channel sub-channel 2. In addition, the second station STA2 transmits a CTS frame to the access point AP through the third sub-channel sub-channel 3. In addition, the third station STA3 transmits a CTS frame to the access point AP through the fourth sub-channel sub-channel 4.

The access point AP receives the CTS frame indicating ready to receive data. The access point AP receives a CTS frame from the first station STA1, the second station STA2, and the third station STA3 through a channel allocated to each of the first station STA1, the second station STA2, STA2, and the third station STA3.

The access point AP transmits data to each of the first station STA1, the second station STA2, and the third station STA3 based on the CTS frame indicating ready to receive data. Specifically, the access point AP transmits data to each of the first station STA1, the second station STA2, and the third station STA3, which transmit the CTS frame. At this time, the access point AP completes the data transmission for the second station STA2 and the third station STA3 before the data transmission for the first station STA1 is completed. The access point AP transmits an ending tone, which is information indicating that the data transmission is terminated, to the second station STA2 and the third station STA3.

The second station STA2 and the third station STA3 receive data and transmit an sACK frame indicating whether data is received based on an ending tone, which is information indicating that data transmission is terminated. Specifically, when a predetermined time elapses after the reception of the ending tone, the third station STA3 transmits an sACK frame indicating whether data is received to the second station STA2 or the first station STA1, each of which is receiving data (S1301). At this time, the predetermined time may be SIFS defined in 802.11.

In addition, when a predetermined time elapses after the ending tone is received by the second station STA2, the second station STA2 transmits an sACK frame to the first station STA1 that is receiving data (S1302). At this time, when receiving the sACK frame from the first station STA1, the second station STA2 transmits to the first station SAT1 an sACK frame indicating whether the first station STA1 receives data and whether the second station STA2 receives data.

The second station STA2 and the third station STA3 transmit an sACK frame and perform a micro-sleep mode. Specifically, the second station STA2 and the third station STA3 perform a micro-sleep mode after a predetermined time from the transmission of the sACK frame. At this time, the predetermined time may be XIFS defined in 802.11.

The first station STA1 that completes the data reception transmits an Agg ACK frame indicating whether the first station STA1, the second station STA2, and the third station STA3 receive data to the access point AP. At this time, the first station STA1 transmits the Agg ACK frame through a channel having a sub-channel allocated to the first station STA1 as a sub-band.

A method for generating an Agg ACK, which is a frame indicating whether the plurality of second wireless communication terminals receive data and its specific format will be described with reference to FIGS. 14 and 15.

Figure 14:
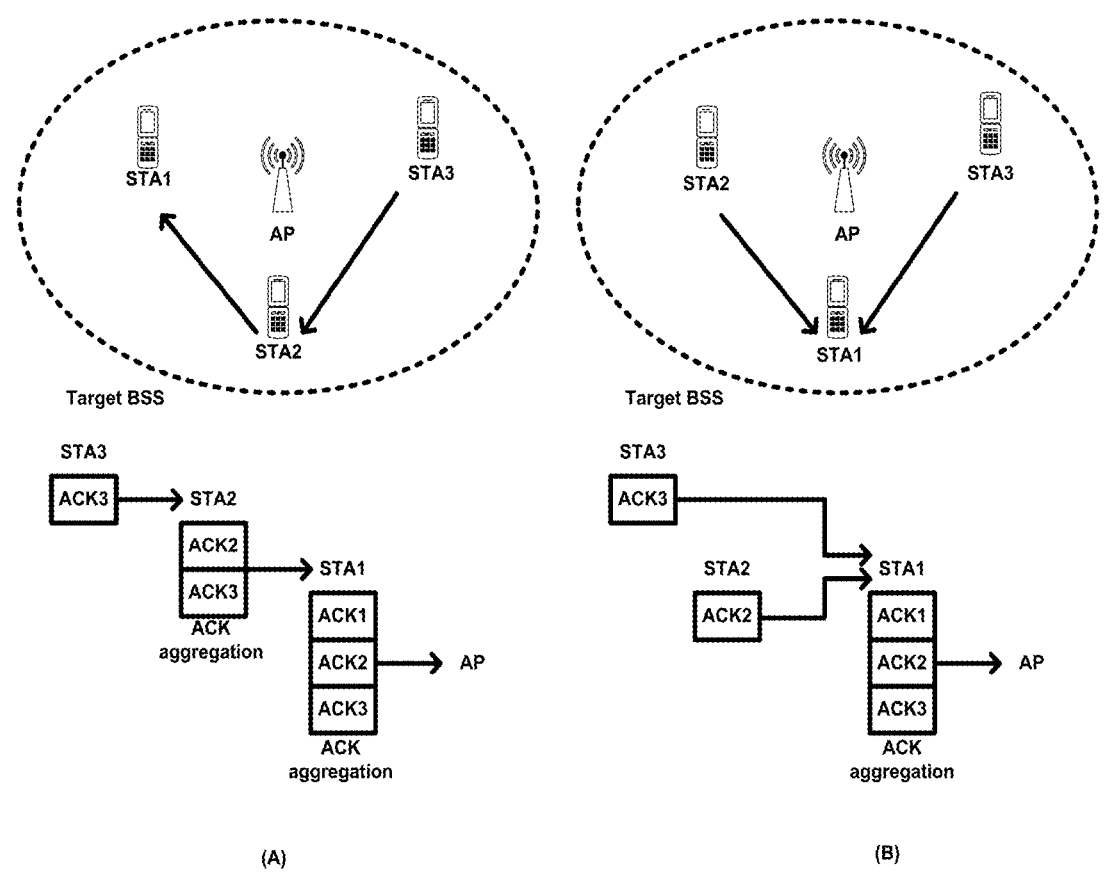
FIG. 14 is a view illustrating that a plurality of stations generate a frame indicating whether the plurality of stations receive data receive data according to an embodiment of the present invention.

FIG. 14 is a view illustrating that a plurality of stations generate a frame indicating whether the plurality of stations receive data receive data according to an embodiment of the present invention.

As described above, the second wireless communication terminal that completes data reception among the plurality of second wireless communication terminals may transmit the sACK frame indicating whether the second wireless communication terminal receives data to another second wireless communication terminal. At this time, the second wireless communication terminal should determine whether to transmit the sACK frame to any of the other second wireless communication terminals. The second wireless communication terminal may transmit an sACK frame to another second wireless communication terminal based on at least any one of whether another second wireless communication terminal transmits a frame indicating ready to receive data and the duration value of data transmitted to another second wireless communication terminal. Specifically, the second wireless communication terminal may transmit an sACK frame to another second wireless communication terminal that transmits a frame indicating ready to receive data. In addition, the second wireless communication terminal may transmit an sACK frame to another second wireless communication terminal that receives data having the duration end time point that is later than the time point that the second wireless communication terminal transmits the sACK frame. For example, the second wireless communication terminal may transmit an sACK frame to any one second wireless communication terminal whose received data duration end time point is later than the time point of transmitting an sACK frame among a plurality of other second wireless communication terminals that transmit a frame indicating ready to receive data.

In another specific embodiment, the second wireless communication terminal may determine another second wireless communication terminal that is to receive an sACK based on whether another second wireless communication terminal is in a communicable position. Specifically, the second wireless communication terminal may transmit an sACK to another second wireless communication terminal that is in a communicable position. At this time, the second wireless communication terminal may receive from the first wireless communication terminal information on whether the second wireless communication terminal is in a communicable position.

In the embodiment of FIG. 14(A), the data transmission for the third station STA3 among the first station STA1, the second station STA2, and the third station STA3 is completed first. The third station STA3 generates a third sACK frame indicating whether the third station STA3 receives data. The third station STA3 transmits the third sACK frame to the second station STA2 having the end time point of the data reception duration later than the transmission time point of the sACK frame.

The second station STA2 generates a second sACK frame based on the third sACK frame received from the third station STA3 and whether the second station STA2 receives data. The second station STA2 transmits the second sACK frame to the third station STA3 having the end time point of the data reception duration later than the transmission time point of the sACK frame.

The first station STA1 generates an Agg ACK frame indicating whether the first station STA1, the second station STA2, and the third station STA3 receive data based on the second sACK frame and whether the third station STA3 receives data. The third station STA3 transmits the Agg ACK frame to the access point AP.

In the embodiment of FIG. 14(B), the data transmission for the third station STA3 among the first station STA1, the second station STA2, and the third station STA3 is completed first. The third station STA3 transmits the third sACK frame to the first station STA1 having the end time point of the data reception duration later than the transmission time point of the sACK frame.

The second station STA2 generates a second sACK based on whether the second station STA2 receives data. The second station STA2 transmits the second sACK frame to the first station STA1 having the end time point of the data reception duration later than the transmission time point of the sACK frame.

The first station STA1 generates an Agg ACK frame indicating whether the first station STA1, the second station STA2, and the third station STA3 receive data based on the second sACK frame, the third sACK frame, and whether the first station STA1 receives data. The first station STA1 transmits the Agg ACK frame to the access point AP.

Figure 15:
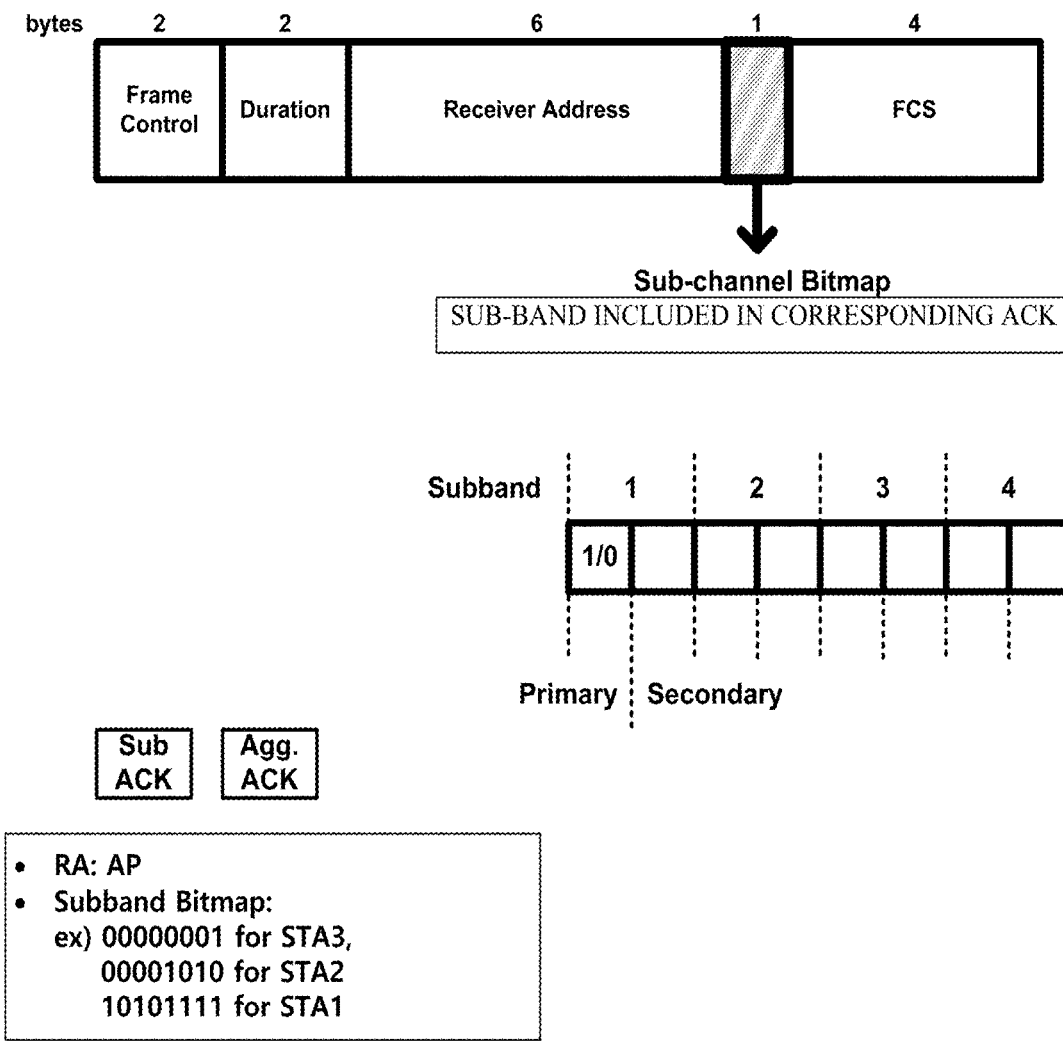
FIG. 15 is a view illustrating the format of a frame indicating whether a plurality of wireless communication terminals receive data according to an embodiment of the present invention.

FIG. 15 is a view illustrating the format of a frame indicating whether a plurality of wireless communication terminals receive data according to an embodiment of the present invention.

The frame indicating whether a plurality of wireless communication terminals receive data, as described above, may indicate whether the plurality of second wireless communication terminals receive data.

In addition, the frame indicating whether a plurality of wireless communication terminals receive data may include information for identifying the plurality of wireless communication terminals. Specifically, the information for identifying a plurality of wireless communication terminals may be an identifier for identifying each of the plurality of wireless communication terminals.

In addition, the frame indicating whether a plurality of wireless communication terminals receive data may include information on a channel allocated to each of the plurality of wireless communication terminals and information indicating whether data transmitted through a corresponding channel is received. Here, the allocated channel may indicate a channel and also a sub-channel that is the sub-band of the channel. At this time, the frame indicating whether a plurality of wireless communication terminals receive data may include information on the order in which data is transmitted through the allocated channel. In a specific embodiment, the frame indicating whether a plurality of wireless communication terminals receive data may include information on whether the data transmitted through the allocated channel is transmitted firstly or secondly. At this time, the information on whether data is transmitted firstly or secondly may be in the format of a 1-bit flag. As described above, in a specific embodiment, the frame indicating whether a plurality of wireless communication terminals receive data may be referred to as an Agg ACK frame.

In addition, a structure of such an Agg ACK frame may be equally applied to the above-described sACK.

In a specific embodiment like FIG. 15, the Agg ACK frame indicating whether a plurality of wireless communication terminals receive data may include a Frame Control field including information on frame control.

In addition, the Agg ACK frame may include a Duration field including information for NAV setting.

Also, the Agg ACK frame may include an identifier for identifying a wireless communication terminal that receives the Agg ACK frame.

In addition, the Agg ACK frame may include a sub-channel Bitmap field indicating information on a sub-channel allocated to each of a plurality of wireless communication terminals and information indicating whether data transmitted through a corresponding sub-channel is received, as described above. The Sub-channel Bitmap field may include information on the order of data transmitted through a sub-channel. In a specific embodiment, as in the embodiment of FIG. 15, the Sub-channel Bitmap field includes a field indicating whether the first data transmitted through a corresponding sub-channel is transmitted and a field indicating whether the second data transmitted through a corresponding sub-channel is transmitted. As in the embodiment of FIG. 15, when the third station STA3 transmits an Agg ACK frame including a Sub-Channel Bitmap field having a value of 1(00000001b), this indicates that any one station receives the second data transmitted through the fourth sub-channel. In addition, when the second station transmits an Agg ACK frame including a Sub-Channel Bitmap field having a value of 10(00001010b), this indicates that any one station or a plurality of stations receive the first data transmitted through the third sub-channel and the second data transmitted through the fourth sub-channel. In addition, when the first station transmits an Agg ACK frame including a Sub-Channel Bitmap field having a value of 175(10101111b), this indicates that any one station or a plurality of stations receive the first data transmitted through the first sub-channel, the first data transmitted through the second sub-channel, the first and second data transmitted through the third sub-channel, and the first and second data transmitted through the fourth sub-channel.

The second wireless communication terminal may continuously maintain the sleep mode through the embodiments described with reference to FIGS. 13 to 15.

It is described with reference to FIGS. 6 to 15 that the first wireless communication terminal transmits data to the second wireless communication terminal. In particular, it is described that the first wireless communication terminal transmits dummy data while transmitting data to the second wireless communication terminal. It is described with reference to FIGS. 16 and 17 that the second wireless communication terminal transmits data to the first wireless communication terminal. In particular, it is described that the second wireless communication terminal transmits dummy data together while transmitting data to the first wireless communication terminal.

Figure 16:
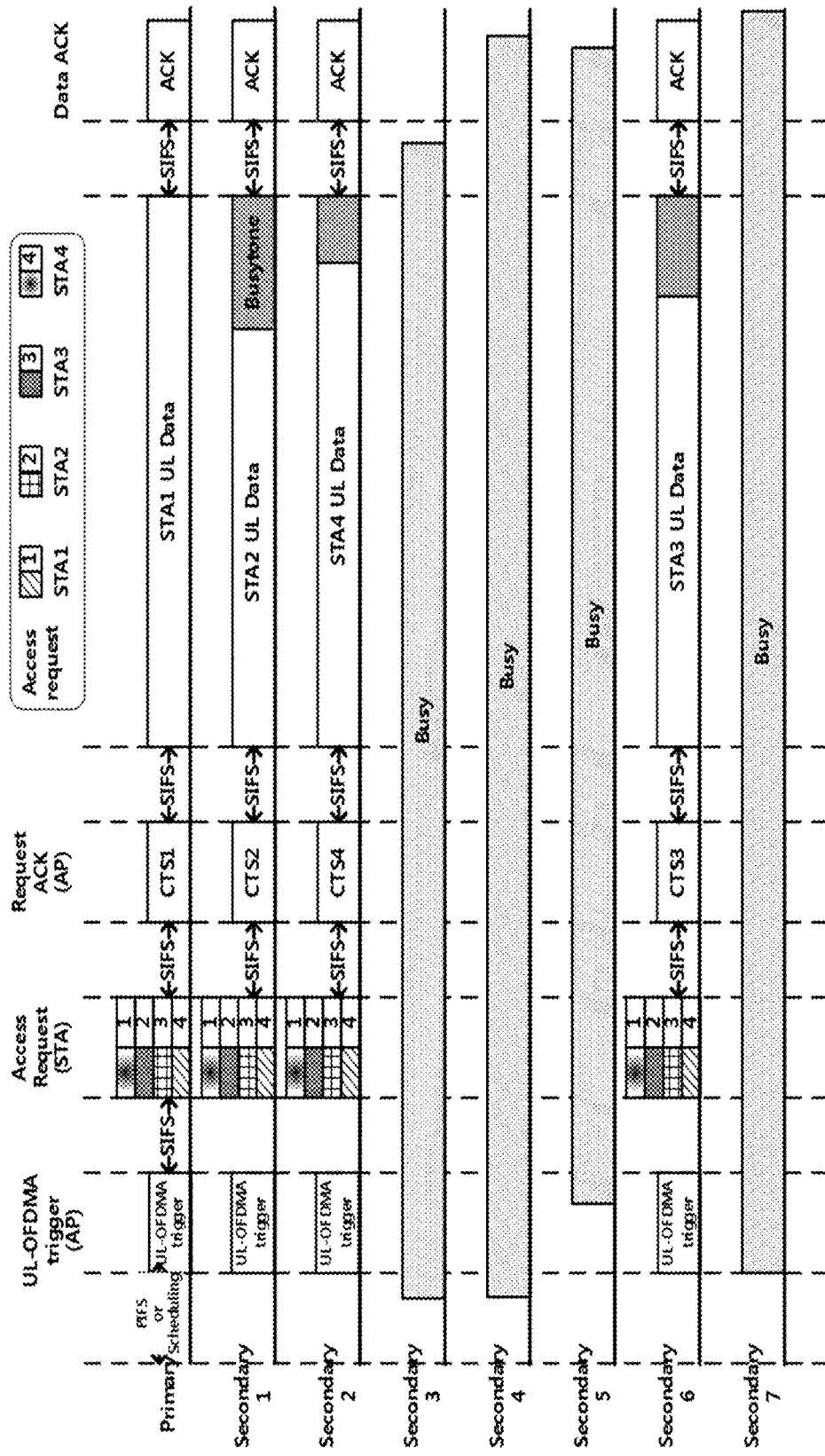
FIG. 16 is a view illustrating that a plurality of stations transmit data to an access point according to an embodiment of the present invention.

FIG. 16 is a view illustrating that a plurality of stations transmit data to an access point according to an embodiment of the present invention.

The first wireless communication terminal may transmit to the second wireless communication terminal a trigger frame for triggering a multiple access for the first wireless communication terminal of the second wireless communication terminal. Specifically, the first wireless communication terminal may transmit the trigger frame to the second wireless communication terminal in each predetermined period. In another specific embodiment, a trigger frame may be transmitted to the second wireless communication terminal after a predetermined time elapses from when a frame is received from the second wireless communication terminal. At this time, the trigger frame may follow the format of the RTS frame. Specifically, the first wireless communication terminal may set a value of an RA field indicating a reception address in an RTS frame to a specific address, and may transmit the RTS frame to a plurality of second wireless communication terminals. At this time, the specific address may indicate uplink access and may be a predetermined broadcast address.

The second wireless communication terminal that receives the trigger frame may transmit data or transmit information required for channel allocation to the first wireless communication terminal. Specifically, after a predetermined time elapses from the transmission of the trigger frame, the second wireless communication terminal may transmit data or transmit information required for channel allocation to the first wireless communication terminal. At this time, the predetermined time may be SIFS defined in the 802.11 standard.

Specifically, the second wireless communication terminal may transmit data by using an orthogonal code in a code set including a plurality of orthogonal codes, or may transmit information required for receiving its allocated channel to the first wireless communication terminal. In a specific embodiment, the second wireless communication terminal may access the first wireless communication terminal by using the orthogonal code as the multiple access code. When the plurality of second wireless communication terminals access the first wireless communication terminal by using different orthogonal codes, even if the plurality of second wireless communication terminals use the same channel, the first wireless communication terminal may extract an orthogonal component of each of the plurality of second wireless communication terminals included in the signal through an auto-correlation operation. At this time, a pattern of each orthogonal code appears in the extracted orthogonal component. Through this, the first wireless communication terminal may simultaneously receive data from the plurality of second wireless communication terminals connected through the same channel or receive information required for channel allocation.

The orthogonal code set may be generated based on information transmitted by the first wireless communication terminal. For example, the second wireless communication terminal may receive a frame including information on the orthogonal code set from the first wireless communication terminal. At this time, the second wireless communication terminal may obtain the orthogonal code based on the information on the orthogonal code set. Specifically, the information on the orthogonal code set may be information on the base sequence used to generate the orthogonal code. Specifically, the information on the base sequence may be an index indicating a base sequence.

In a specific embodiment, the second wireless communication terminal may transmit data or transmit information required for channel allocation by using an orthogonal code allocated to the second wireless communication terminal in advance. At this time, the first wireless communication terminal may allocate an orthogonal code corresponding to the second wireless communication terminal as a association identifier for identifying the association of the second wireless communication terminal and the first wireless communication terminal. At this time, the association identifier may be an AID. In such a case, the second wireless communication terminal may transmit data or information required for receiving an allocated channel by using the association identifier as the orthogonal code.

In another specific embodiment, the second wireless communication terminal may transmit data or transmit information required for channel allocation by randomly selecting any one orthogonal code from an orthogonal code set including a plurality of orthogonal codes. At this time, the first wireless communication terminal may transmit information for identifying the first wireless communication terminal together while transmitting data or transmitting information required for channel allocation.

When the second wireless communication terminal transmits information required for channel allocation, the first wireless communication terminal allocates a channel to each of the plurality of second wireless communication terminals on the basis of the information required for receiving an allocated channel. At this time, the information required for receiving an allocated channel may include information indicating the size of data to be transmitted by the second wireless communication terminal. In addition, the information required for receiving an allocated channel may include an identifier for identifying the second wireless communication terminal. At this time, the identifier for identifying the second wireless communication terminal may be an AID or a partial AID that identifies a association with the first wireless communication terminal. In addition, the information required for receiving an allocated channel may include channel access map information indicating a channel to be allocated to the second wireless communication terminal. At this time, the channel access map information may include information on the idle channel detected by the second wireless communication terminal.

The first wireless communication terminal transmits a frame indicating an allocated channel to the second wireless communication. Specifically, the first wireless communication terminal may transmit a frame indicating an allocated channel to the second wireless communication terminal through a channel allocated to the second wireless communication terminal. At this time, the frame indicating the channel allocated to the second wireless communication terminal may include information indicating the time that the second wireless communication terminal is able to use for data transmission. At this time, the time available for data transmission may be a time commonly applied to a plurality of second wireless communication terminals. Therefore, the time available for data transmission may be determined based on the longest time among the data transmission times of the plurality of second wireless communication terminals. At this time, the time available for data transmission may be transmitted as a duration field value of a frame indicating a channel allocated to the second wireless communication terminal. Therefore, the duration field value of the frame indicating the channel allocated to the second wireless communication terminal may be specified based on the time required for transmitting the largest data among the transmission data of the plurality of second wireless communication terminals. Also, the frame indicating the channel allocated to the second wireless communication terminal may be a CTS frame.

The second wireless communication terminal obtains information on the channel allocated to the second wireless communication terminal based on the frame indicating the channel allocated to the second wireless communication terminal. When the frame indicating the channel allocated to the second wireless communication terminal is a CTS frame, the second wireless communication terminal determines a channel, through which a CTS frame using an identifier for identifying the second wireless communication terminal itself as a reception address RA is transmitted, as a channel allocated to the second wireless communication terminal itself. At this time, the identifier for identifying the second wireless communication terminal may be a Media Access Control (MAC) address corresponding to the AID of the second wireless communication terminal.

The second wireless communication terminal transmits data to the first wireless communication terminal through the channel allocated to the second wireless communication terminal. At this time, the second wireless communication terminal may transmit dummy data when there is a remaining time for transmitting the second wireless communication terminal's own data. At this time, as described above, the dummy data represents meaningless data that is distinguished from meaningful data transmitted through a data frame. Specifically, the dummy data may be a continuous pattern of a specific value such as "0". Specifically, the dummy data may be referred to as a busytone. In a specific embodiment, the second wireless communication terminal may transmit data and then, transmit the dummy data during a time for transmitting data after the data frame transmission. The FCS field indicates whether an error occurs. Therefore, when the dummy data is transmitted before the FCS field, the first wireless communication terminal should receive the dummy data until the FCS field is received and confirm whether the FCS field is received. Therefore, in such a case, the first wireless communication terminal may not stop an operation. Therefore, after the data frame transmission, it may indicate after the FCS field of the data frame is transmitted. At this time, as described above, the second wireless communication terminal may obtain information on the time for transmitting data from the frame indicating the channel allocated to the second wireless communication terminal. Specifically, the second wireless communication terminal may obtain the time for transmitting data from the duration field of the frame indicating the channel allocated to the second wireless communication terminal. It is possible to prevent another wireless communication terminal from using a corresponding channel through such an operation of the second wireless communication terminal. In addition, if the second wireless communication terminal transmits dummy data after the data frame transmission, the first wireless communication terminal does not need to perform calculation on the data transmitted on a corresponding channel while the dummy data is transmitted. Therefore, the processing burden of the first wireless communication terminal may be reduced through such an operation.

The first wireless communication terminal may transmit an ACK frame to each of the plurality of second wireless communication terminals that transmit data through a channel allocated to each of the plurality of second wireless communication terminals. Specifically, after a predetermined time elapses from the reception of the last transmission completed data frame, the first wireless communication terminal transmits an ACK frame to a plurality of second wireless communication terminals that transmit data through a channel allocated to each of the plurality of second wireless communication terminals. At this time, the predetermined time may be SIFS defined in 802.11.

In an embodiment where the first wireless communication terminal does not transmit the trigger frame, the second wireless communication terminal may access the first wireless communication terminal at a predetermined time point and transmit information required for transmitting data or receiving an allocated channel.

In another specific embodiment, when the channel is idle for a predetermined time or longer, the second wireless communication terminal may access the first wireless communication terminal to transmit data or transmit information required for receiving an allocated channel. Then, the operations of the first wireless communication terminal and the second wireless communication terminal may be the same as those described above. Accordingly, description for this is omitted.

In the embodiment of FIG. 16, an access point AP transmits a trigger frame for triggering multiple uplink access to a plurality of stations.

The first station STA1, the second station STA2, the third station STA3, and the fourth station STA4, which receive a trigger frame, transmit information required for receiving an allocated channel to the access point AP by using each different orthogonal code. At this time, as described above, the information required for receiving an allocated channel includes at least one of information indicating the size of data to be transmitted by the second wireless communication terminal, an identifier for identifying the second wireless communication terminal, and channel access map information indicating a channel to be allocated to the second wireless communication terminal. At this time, the channel access map information may include information on the idle channel detected by the second wireless communication terminal.

The access point AP performs an auto-correlation calculation on the received signal and obtains information required for channel allocation from a signal transmitted by each of the first station STA1, the second station STA2, the third station STA3, and the fourth station STA4. At this time, since the first station STA1, the second station STA2, the third station STA3, and the fourth station STA4 all use different orthogonal codes, the access point AP may identify a signal transmitted by each of the first station STA1, the second station STA2, the third station STA3, and the fourth station STA4.

The access point AP allocates a channel to the first station STA1, the second station STA2, the third station STA3, and the fourth station STA4 based on information required for channel allocation. At this time, the access point AP detects an idle channel and allocates the idle channel to the first station STA1, the second station STA2, and the third station STA3. Specifically, the access point AP allocates a primary channel Primary to the first station STA1, allocates a first secondary channel Secondary 1 to the second station STA2, allocates a sixth secondary channel Secondary 6 to the third station STA3, and allocates a second secondary channel to the fourth station STA4.

The access point AP transmits a CTS frame through a channel allocated to each of the first station STA1, the second station STA2, the third station STA3, and the fourth station STA4.

Each of the first station STA1, the second station STA2, the third station STA3, and the fourth station STA4 transmits data through a channel allocated to each of the first station STA1, the second station STA2, the third station STA3, and the fourth station STA4. At this time, the second station STA2, the third station STA3, and the fourth station STA4 transmit dummy data until the transmission of the first station STA1 is terminated after their data transmissions.

The access point AP receives data from each of the first station STA1, the second station STA2, the third station STA3, and the fourth station STA4, and transmits an ACK frame to each of the first station STA1, the second station STA2, the third station STA3, and the fourth station STA4. Specifically, from when receiving data from the first station STA1, the access point AP transmits an ACK frame to each of the first station STA1, the second station STA2, the third station STA3, and the fourth station STA4 after SIFS.

Figure 17:
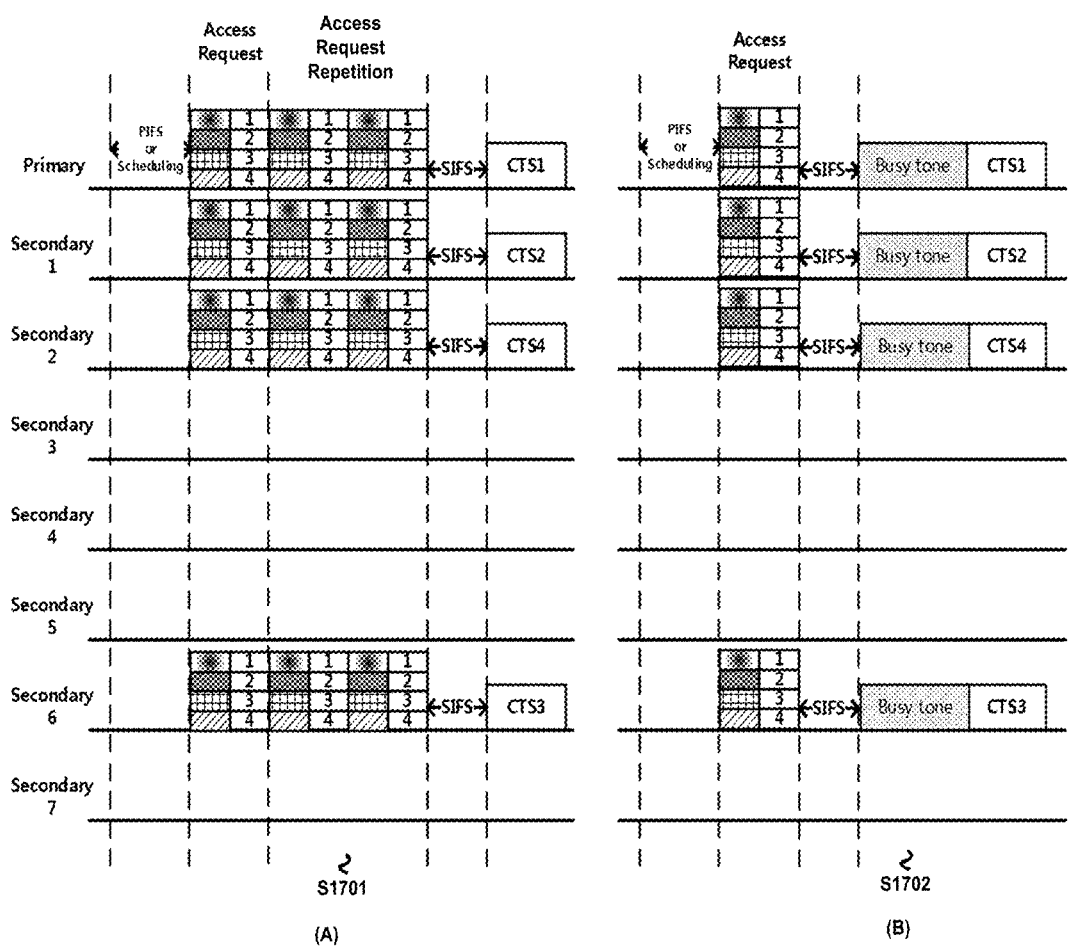
FIG. 17 is a view illustrating that a plurality of stations transmit data while reducing the processing burden of an access point according to an embodiment of the present invention.

FIG. 17 is a view illustrating that a plurality of stations transmit data while reducing the processing burden of an access point according to an embodiment of the present invention.

The second wireless communication terminal may transmit dummy data after transmitting one frame to the first wireless communication terminal. Specifically, the first wireless communication terminal may transmit dummy data after transmitting the FCS field of any one data frame to the second wireless communication terminal. As described above, such dummy data may be referred to as a busytone. Specifically, the second wireless communication terminal may transmit dummy data after transmitting a frame including information required for channel allocation to the first wireless communication terminal. Also, the second wireless communication terminal may transmit dummy data after transmitting the data frame including data to the first wireless communication terminal. In a specific embodiment, the second wireless communication terminal may transmit dummy data after a predetermined time elapses from when the frame is transmitted to the first wireless communication terminal. At this time, the predetermined time may be SIFS defined in 802.11. Through this, the first wireless communication terminal has a time for performing an operation while dummy data is transmitted. In addition, it is possible to prevent another terminal not participating in transmission from accessing a corresponding channel.

The second wireless communication terminal may repeatedly transmit the same frame to the first wireless communication terminal. Specifically, the second wireless communication terminal may transmit to the first wireless communication terminal a frame including information for receiving an allocated channel. Further, the second wireless communication terminal may repeatedly transmit a frame including data to the first wireless communication terminal. At this time, the first wireless communication terminal may ignore the redundantly transmitted frames. Through this, the first wireless communication terminal has a time for performing an operation. In addition, it is possible to prevent another terminal not participating in transmission from accessing a corresponding channel.

In the embodiment of FIG. 17(A), the first station STA1, the second station STA2, the third station STA3, and the fourth station STA4 transmit to an access point a frame including information required for receiving an allocated channel by using each different code. At this time, the first station STA1, the second station STA2, the third station STA3, and the fourth station STA4 further transmit a frame including information required for receiving an allocated channel to the access point AP twice (S1701). The access point AP ignores the second and third frames received after the frame including information required for receiving an allocated channel from an access point that receives data first. Through this, the access point AP secures the calculation time required for allocating a channel to the first station STA1, the second station STA2, the third station STA3, and the fourth station STA4.

The access point AP transmits a CTS frame to each of the first station STA1, the second station STA2, the third station STA3, and the fourth station STA4 through a channel allocated to each of the first station STA1, the second station STA2, the third station STA3, and the fourth station STA4.

In the embodiment of FIG. 17(B), the first station STA1, the second station STA2, the third station STA3, and the fourth station STA4 transmit to an access point a frame including information required for receiving an allocated channel by using each different orthogonal code.

The first station STA1, the second station STA2, the third station STA3, and the fourth station STA4 transmit dummy data to the access point AP after transmitting a frame including information required for receiving an allocated channel (S1902). Specifically, the first station STA1, the second station STA2, the third station STA3, and the fourth station STA4 transmit dummy data to the access point AP after SIFS from when transmitting a frame including information required for receiving an allocated channel. Through this, the access point AP secures the calculation time required for allocating a channel to the first station STA1, the second station STA2, the third station STA3, and the fourth station STA4.

The access point AP transmits a CTS frame to each of the first station STA1, the second station STA2, the third station STA3, and the fourth station STA4 through a channel allocated to each of the first station STA1, the second station STA2, the third station STA3, and the fourth station STA4.

Figure 18:
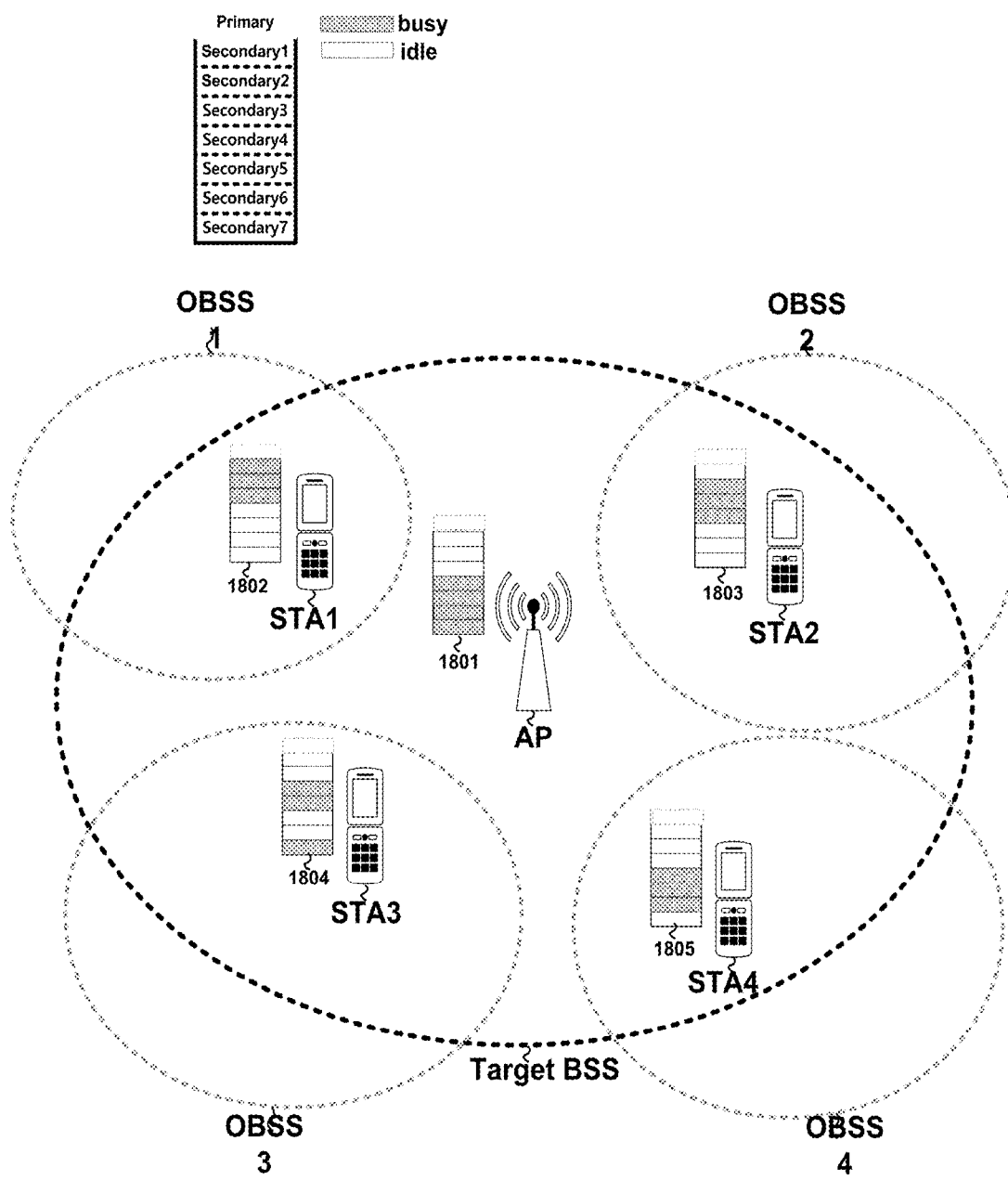
FIG. 18 is a view illustrating a basic service set including a plurality of stations and an access point according to an embodiment of the present invention.

FIG. 18 is a view illustrating a basic service set including a plurality of stations and an access point according to an embodiment of the present invention.

The first wireless communication terminal and each of the plurality of second wireless communication terminals may be physically located at a long distance from each other. In such a case, the first wireless communication terminal may not detect an Overlapping Basic Service Set (OBSS) that affects each of the plurality of second wireless communication terminals. Therefore, the idle state of a channel detected by the first wireless communication terminal and each of the plurality of second wireless communication terminals may be different. Therefore, when the first wireless communication terminal allocates a channel to each of the plurality of second wireless communication terminals in consideration of only the channel state detected by the first wireless communication terminal itself, a channel where a collision with a wireless communication terminal in another BSS is able to occur may be allocated to the plurality of second wireless communication terminals. Such a situation will be described with reference to the embodiment of FIG. 18.

In the embodiment of FIG. 18, the access point AP detects the primary channel Primary, the first secondary channel Secondary 1, the second secondary channel Secondary 2, and the third secondary channel Secondary 3 as idle channels (1801). However, the first station STA1 is affected by the first OBSS OBSS1, so that it detects the primary channel Primary, the fourth secondary channel Secondary 4, the fifth secondary channel Secondary 5, the sixth secondary channel Secondary 6, and the seventh secondary channel Secondary 7 as idle channels (1802). In addition, the second station STA2 is affected by the second OBSS OBSS2, so that it detects the primary channel Primary, the first secondary channel Secondary 1, the fifth secondary channel Secondary 5, the sixth secondary channel Secondary 6, and the seventh secondary channel Secondary 7 as idle channels (1803). In addition, the third station STA3 is affected by the third OBSS OBSS3, so that it detects the primary channel Primary, the first secondary channel Secondary 1, the second secondary channel Secondary 2, the fifth secondary channel Secondary 5, and the sixth secondary channel Secondary 6 as idle channels (1804). In addition, the fourth station STA4 is affected by the fourth OBSS OBSS4, so that it detects the primary channel Primary, the first secondary channel Secondary 1, the second secondary channel Secondary 2, the third secondary channel Secondary 3, and the seventh secondary channel Secondary 7 as idle channels (1805).

At this point, when the access point AP allocates the first secondary channel Secondary 1 to the first station STA1, allocates the second secondary channel Secondary 2 to the second station STA2, allocates the primary channel Primary to the third station STA3, and allocates the sixth secondary channel Secondary 6 to the fourth station STA4, the remaining stations except for the third station STA3 may not use the allocated channels.

Therefore, the first wireless communication terminal should allocate a channel to each of the second wireless communication terminals in consideration of the channel state detected by each of the plurality of second wireless communication terminals. This will be described with reference to FIGS. 19 to 22.

Figure 19:
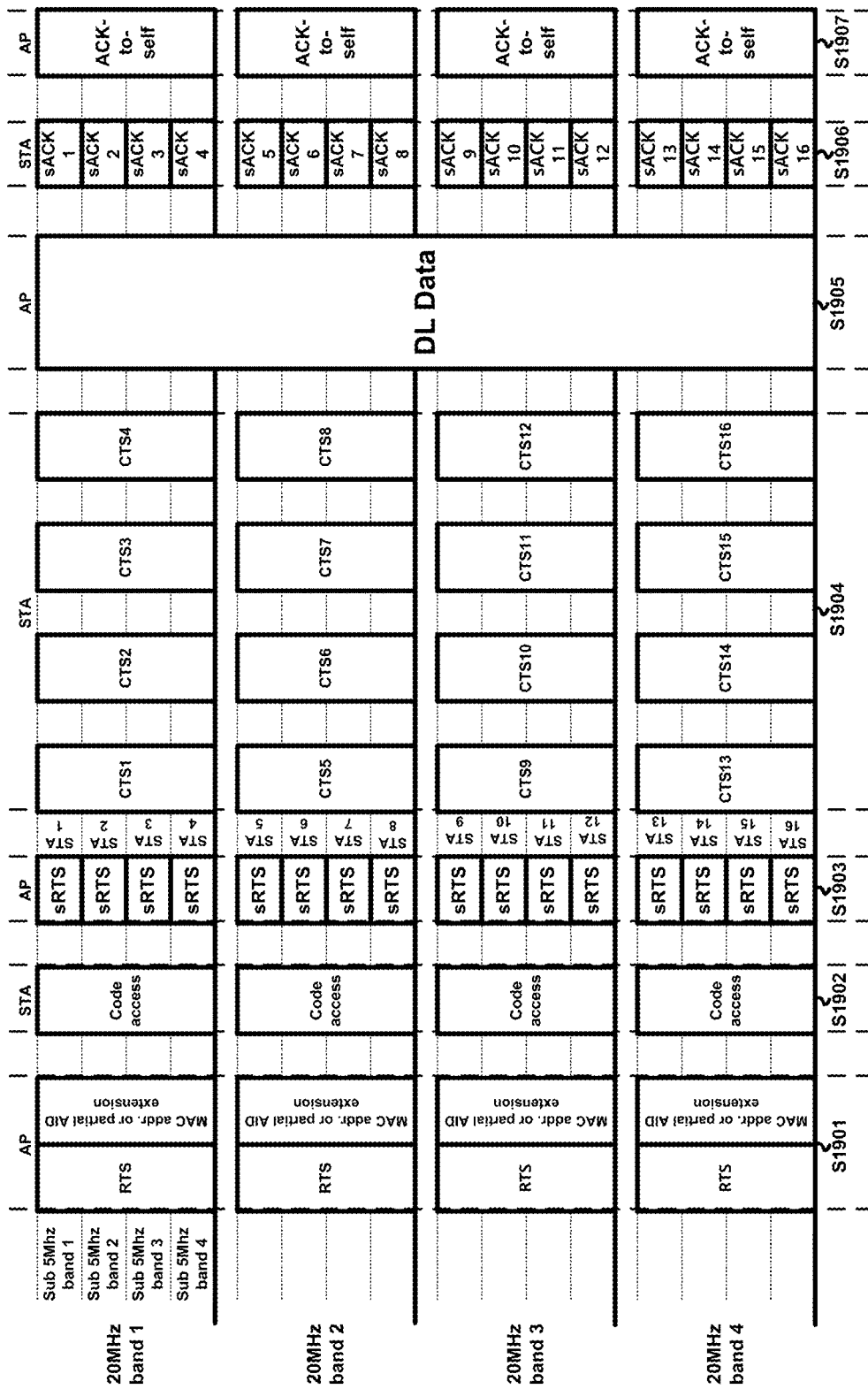
FIG. 19 is a view illustrating that an access point transmits data to a plurality of stations by using a frame indicating that data is transmitted to a plurality of wireless communication terminals according to an embodiment of the present invention.

FIG. 19 is a view illustrating that an access point transmits data to a plurality of stations by using a frame indicating that data is transmitted to a plurality of wireless communication terminals according to an embodiment of the present invention.

The first wireless communication terminal transmits to the plurality of second wireless communication terminals a frame indicating that there is data to be transmitted to the plurality of second wireless communication terminals. The frame indicating that there is data to be transmitted to the plurality of second wireless communication terminals may include information for identifying the plurality of second wireless communication terminals that are to receive data. The information for identifying the plurality of second wireless communication terminals may be a plurality of association identifiers for identifying each of the plurality of second wireless communication terminals. At this time, the association identifier is an identifier for identifying the association of the first wireless communication terminal and the second wireless communication terminal. Specifically, the association identifier may be an AID. In another specific embodiment, the AID may be a partial AID. For example, the association identifier may be the MAC address of the second wireless communication terminal corresponding to the AID. In addition, the frame indicating that there is data to be transmitted to a plurality of second wireless communication terminals may include a Group Address for identifying a group including the second wireless communication terminals.

The frame indicating that there is data to be transmitted to the plurality of second wireless communication terminals may be one obtained by extending the legacy RTS frame. Specifically, a field located at the position of a receiver address field of an legacy RTS frame in a frame indicating that there is data to be transmitted to the second wireless communication terminal includes a group identifier for identifying a group including a plurality of second wireless communication terminals that are to receive data. In addition, the frame indicating that there is data to be transmitted to the plurality of second wireless communication terminals may include an extension field for extending an RTS frame. At this time, the extension field may be located after the FCS field of the legacy RTS frame. In addition, the extension field may include information for identifying each of the plurality of second wireless communication terminals. In a specific embodiment, when a frame indicating that there is data to be transmitted to a plurality of second wireless communication terminals is used for a channel having a bandwidth of 160 MHz, the extension field may include the addresses and partial AIDs of a maximum of 32 second wireless communication terminals.

The second wireless communication terminal may determine whether data is to be transmitted to the second wireless communication terminal based on the frame indicating that there is data to be transmitted to the plurality of second wireless communication terminals. Specifically, the second wireless communication terminal determines whether data is transmitted to the second wireless communication terminal according to whether the frame indicating that there is data to be transmitted to the plurality of second wireless communication terminals includes information for identifying the second wireless communication terminal.

The second wireless communication terminal determining that data is to be transmitted accesses the first wireless communication terminal. At this time, the first wireless communication terminal may designate a plurality of access methods to allow the plurality of second wireless communication terminals to make an access by using a predetermined communication method. At this time, the access method may be related to at least one of an access time point, an orthogonal code used for access, and a channel used for access. In such a case, the second wireless communication terminal may access the first wireless communication terminal through any one of a plurality of designated access methods.

Specifically, the first wireless communication terminal may designate an orthogonal code set that the plurality of second wireless communication terminals access. Accordingly, the second wireless communication terminal may access the first wireless communication terminal by using any one orthogonal code in the orthogonal code set.

In a specific embodiment, another base sequence that is guaranteed to be orthogonal to an adjacent BSS is allocated to BSS. For example, the plurality of base sequences may be allocated to the plurality of BSSs, respectively. At this time, the first wireless communication terminal and the second wireless communication terminal may receive an index indicating the allocated base sequence. The first wireless communication terminal and the second wireless communication terminal may obtain a base sequence according to the index indicating the received base sequence. In a specific embodiment, when the BSS uses eight channels in a 20 MHz unit, the length of the base sequence may be eight or more. The length of the base sequence may be longer for stable zero auto-correlation characteristics. Through this, the first wireless communication terminal and the second wireless communication terminal may minimize base sequence interference between adjacent BSSs. Also, in a specific embodiment, the base sequence may be generated by a Zadoff-Chu sequence that satisfies Constant Amplitude Zero Auto Correlation (CAZAC) characteristics.

The first wireless communication terminal and the second wireless communication terminal may generate a plurality of orthogonal codes included in the orthogonal code set based on the allocated base sequence. Specifically, the first wireless communication terminal and the second wireless communication terminal may generate a plurality of orthogonal codes included in the orthogonal code set by cyclic-shifting the allocated base sequence.

The first wireless communication terminal may allocate a plurality of orthogonal codes included in the orthogonal code set to a plurality of second wireless communication terminals, respectively. Accordingly, the second wireless communication terminal may access the first wireless communication terminal by using the orthogonal code allocated to the second wireless communication terminal. At this time, the second wireless communication terminal may obtain an orthogonal code allocated to the second wireless communication terminal based on the frame indicating that there is data to be transmitted to the plurality of second wireless communication terminals. Specifically, the second wireless communication terminal may obtain an orthogonal code allocated to the second wireless communication terminal according to the arrangement order of second wireless communication terminal identifiers in the frame indicating that there is data to be transmitted to the plurality of second wireless communication terminals. For this, the second wireless communication terminal may receive information on a base sequence and a code set based on the base sequence during a association process with the first wireless communication terminal. The information on the base sequence may be an index indicating a base sequence. In a specific embodiment, the orthogonal codes in the code set may be 32. For example, the second wireless communication terminal may receive an index indicating a base sequence and a total of 32 orthogonal codes generated by cyclic-shifting the base sequence during the association process with the first wireless communication terminal. When it is assumed that the second wireless communication terminal identifier is aligned in the seventh order in the frame indicating that there is data to be transmitted to the plurality of second wireless communication terminals, the second wireless communication terminal may obtain the seventh orthogonal code among the 32 orthogonal codes as the orthogonal code allocated to the second wireless communication terminal.

In another specific embodiment, the second wireless communication terminal may access the first wireless communication terminal by randomly selecting any one of the plurality of orthogonal codes. In such a case, since the first wireless communication terminal is not able to identify the second wireless communication terminal through the orthogonal code, the second wireless communication terminal transmits information for identifying the second wireless communication terminal while accessing the first wireless communication terminal.

When a plurality of second wireless communication terminals are connected using different orthogonal codes, orthogonality is maintained between orthogonal codes. Accordingly, the first wireless communication terminal may obtain the orthogonal code included in an access signal through the auto-correlation operation. Specifically, the first wireless communication terminal may perform an auto-correlation operation on the received signal to obtain a base sequence and a signal pattern obtained by cyclic-shifting the base sequence. The first wireless communication terminal may determine the orthogonal code included in the access signal by comparing the cyclic shift position where a peak value included in the obtained signal pattern appears with a plurality of orthogonal codes included in the code set. Through this, the wireless communication terminal may recognize that the second wireless communication terminal, to which the obtained orthogonal code is allocated, accesses the first wireless communication terminal.

At this time, the second wireless communication terminal may transmit information on the idle channel detected by the second wireless communication terminal to the first wireless communication terminal. Specifically, the second wireless communication terminal may access the first wireless communication terminal through all the idle channels detected as the channel access idle channel by the second wireless communication terminal.

The first wireless communication terminal allocates a frequency band to each of the plurality of second wireless communication terminals that access the first wireless communication terminal. Specifically, the first wireless communication terminal transmits may allocate a channel to each of the plurality of second wireless communication terminals, based on the information on a channel detected as an idle channel by the first wireless communication terminal and an idle channel detected by each of the plurality of second wireless communication terminals. In a specific embodiment, the first wireless communication terminal may allocate to the second wireless communication terminal a channel that is detected as an idle channel by the first wireless communication terminal and accessed by detecting a corresponding channel as an idle channel by the second wireless communication. In addition, the first wireless communication terminal may allocate a frequency band to each second wireless communication terminal by a sub-channel unit that is a sub-channel of a channel. At this time, the frequency bandwidth of the channel may be 20 MHz and the bandwidth of the sub-channel may be 5 MHz.

The first wireless communication terminal transmits a frame indicating a channel allocated to the second wireless communication terminal to the second wireless communication terminal. As described above, the channel allocated to the second wireless communication terminal may be a sub-channel. A specific format of a frame indicating a channel allocated to the second wireless communication terminal will be described later with reference to FIG. 20.

The second wireless communication terminal transmits a frame indicating ready to receive data to the first wireless communication terminal. The second wireless communication terminal may transmit a frame indicating ready to receive data to the first wireless communication terminal through a channel allocated to the second wireless communication terminal. When receiving an allocated sub-channel, the second wireless communication terminal transmits to the first wireless communication terminal a frame indicating ready to receive data through the channel having a corresponding sub-channel as a sub-band. Specifically, a plurality of second wireless communication terminals that receive allocated sub-channels included in the same channel may sequentially transmit frames indicating ready to receive data. In a specific embodiment, a plurality of second wireless communication terminals that receive allocated sub-channels included in the same channel may sequentially transmit frames indicating ready to receive data according to a round-robin method. Especially, the second wireless communication terminal may transmit to the first wireless communication terminal a frame indicating ready to receive data through the channel having a corresponding sub-channel as a sub-band. At this time, the order of transmitting a frame indicating ready to receive data from the second wireless communication terminal to the first wireless communication terminal may be an arrangement order of information on a channel allocated to the second wireless communication terminal included in the frame indicating a channel allocated to the second wireless communication terminal. Specifically, when the frame indicating the channel allocated to the second wireless communication terminal includes information on the channel allocation in the order of the first sub-channel and the second sub-channel, the second wireless communication terminal that receives the allocated first sub-channel may transmit a frame indicating ready to receive data to the first wireless communication terminal, and the second wireless communication terminal that receives the allocated second sub-channel may transmit a frame indicating ready to receive data to the first wireless communication terminal.

The first wireless communication terminal transmits data to the second wireless communication terminal through the channel allocated to the second wireless communication terminal. Specifically, the first wireless communication terminal may transmit data to the second wireless communication terminal through the above-described embodiments. Also, the first wireless communication terminal may transmit data to the second wireless communication terminal through a method other than the above-described embodiment.

The second wireless communication terminal transmits a frame indicating whether data is received to the first wireless communication terminal through a channel allocated to the second wireless communication terminal. At this point, the frame indicating whether data is received may be the above-described sACK frame.

Also, the first wireless communication terminal may receive a frame indicating whether data is to be received from the second wireless communication terminal, and transmit an ACK-to-Self frame indicating the ACK frame indicating that the reception address is the first wireless communication terminal. In particular, when allocating a frequency band to the second wireless communication terminal by a sub-channel unit, the first wireless communication terminal may transmit the ACK-to-Self frame.

In the embodiment of FIG. 19, the access point AP transmits a frame indicating that there is data to be transmitted to the plurality of second wireless communication terminals to the first station STA1 to the sixteenth station STA16 (S1901). At this time, a frame indicating that there is data to be transmitted to a plurality of second wireless communication terminals may include a partial AID of a plurality of stations that are to receive data or the MAC addresses of a plurality of stations to receive data. In addition, the frame indicating that there is data to be transmitted to a plurality of second wireless communication terminals may follow the format of the RTS frame.

The first to sixteenth stations STA1 to STA16 access the access point AP based on the allocated orthogonal code (S1902). At this time, the first to sixteenth stations STA1 to STA16 access the access point AP through different orthogonal codes. Specifically, as in the above-described embodiment, the first to sixteenth stations STA1 to STA16 may access the access point AP through all of the channels detected as idle channels by the first to sixteenth stations STA1 to STA16.

The access point AP obtains the orthogonal code included in an access signal through the auto-correlation operation. Since the relationship between an orthogonal code and a station that receives an allocated orthogonal code is known, the access point AP may determine which station accesses the access point AP.

The access point AP transmits an sRTS frame, which is a frame indicating a channel allocated to the second wireless communication terminal, to each of the first to sixteenth stations STA1 to STA16 that access the access point AP (S1903). Specifically, the access point AP transmits an sRTS frame to each of the first to sixteenth stations STA1 to STA16 through a sub channel allocated to each of the first to sixteenth stations STA1 to STA16.

The first to sixteenth stations transmit a CTS frame indicating ready to receive data sequentially through a channel having a sub-channel allocated to each of the first to sixteenth stations as a sub-band (S1904). Specifically, the first to fourth stations STA1 to STA4 sequentially transmit CTS frames through the first band (20 MHz band1). In addition, the fifth station STA5 to the eighth station STA8 sequentially transmit the CTS frames through the second band (20 MHz band2). In addition, the ninth station STA9 to the twelfth station STA12 sequentially transmit the CTS frames through the third band (20 MHz band2). In addition, the thirteenth station STA13 to the sixteenth station STA16 sequentially transmit the CTS frames through the fourth band (20 MHz band4).

The access point AP transmits data to the first station STA1 to the sixteenth station STA16 (S1905). Specifically, the access point AP may transmit data to the first station STA1 to the sixteenth station STA16 according to the above-described embodiment. In addition, the access point AP may transmit data to the first station STA1 to the sixteenth station STA16 through a method other than the above-described embodiment.

Each of the first station STA1 to the sixteenth station STA16 transmits an sACK frame indicating whether data is received through a channel allocated to each of the first station STA1 to the sixteenth station STA16 (S1906).

The access point AP that receives the sACK frame transmits the above-described ACK-to-Self frame (S1907). Through this, compatibility with wireless communication terminals that do not support embodiments of the present invention is secured.

It is described in the above-described embodiment that the first wireless communication terminal specifies an access method. At this time, the first wireless communication terminal may specify a channel to be used to access the first wireless communication terminal by the second wireless communication terminal. This will be described with reference to FIG. 20.

Figure 20:
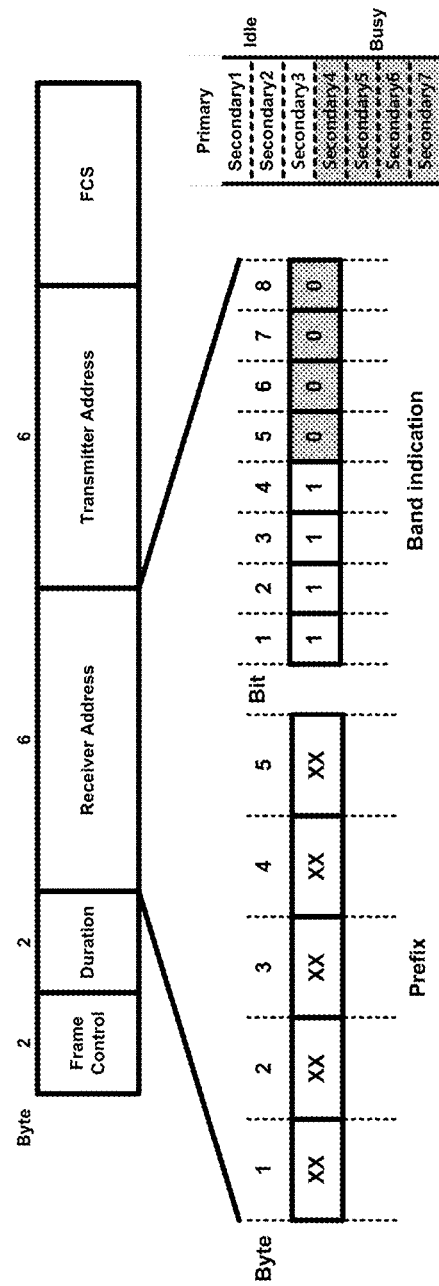
FIG. 20 is a view illustrating the format of a frame indicating a channel to be used to access a first wireless communication terminal by a second wireless communication terminal according to an embodiment of the present invention.

FIG. 20 is a view illustrating the format of a frame indicating a channel to be used to access a first wireless communication terminal by a second wireless communication terminal according to an embodiment of the present invention.

The first wireless communication terminal may transmit a frame, which indicates a channel to be used to access the first wireless communication terminal by the second wireless communication terminal, to the second wireless communication terminal. The frame indicating a channel to be used to access the first wireless communication terminal by the second wireless communication terminal may include access channel information that is information on a channel accessible by the second wireless communication terminal. Specifically, the access channel information may include information about an index indicating a channel to which the second wireless communication terminal is able to access. For example, the access channel information may include information on an index indicating a plurality of channels and information indicating whether it is possible to access a channel indicated by a corresponding index.

The second wireless communication terminal receives a frame indicating a channel to be used to access the first wireless communication terminal by the second wireless communication terminal. The second wireless communication terminal may access any one of the plurality of channels based on a frame indicating a channel to be used to access the first wireless communication terminal by the second wireless communication terminal. Specifically, the second wireless communication terminal may obtain access channel information from a frame indicating a channel to be used to access the first wireless communication terminal by the second wireless communication terminal. The second wireless communication terminal may access any one of a plurality of accessible channels according to the access channel information. Specifically, the second wireless communication terminal may randomly access any one of a plurality of accessible channels according to the obtained access channel information. According to another embodiment of the present invention, the second wireless communication terminal may access all the channels detected as idle channels among a plurality of accessible channels according to the access channel information obtained through an idle channel.

In a specific embodiment, the frame indicating a channel to be used to access the first wireless communication terminal by the second wireless communication terminal may be identical to the frame indicating that there is data to be transmitted to the plurality of second wireless communication terminals.

In another specific embodiment, the frame indicating a channel to be used to access the first wireless communication terminal by the second wireless communication terminal may be different from the frame indicating that there is data to be transmitted to the plurality of second wireless communication terminals. At this time, after transmitting to a plurality of second wireless communication terminals a frame indicating that there is data to be transmitted to the second wireless communication terminal, the first wireless communication terminal may transmit to the plurality of second wireless communication terminals a frame indicating a channel to be used to access the first wireless communication terminal by the second wireless communication terminal.

In the embodiment of FIG. 20, a frame indicating a channel to be used to access the first wireless communication terminal by the second wireless communication terminal may include a Frame Control field indicating information on frame control.

In addition, the frame indicating a channel to be used to access the first wireless communication terminal by the second wireless communication terminal may include a Duration field indicating information for NAV setting.

In addition, the frame indicating a channel to be used to access the first wireless communication terminal by the second wireless communication terminal may include a Receiver Address field indicating the address of the second wireless communication terminal that receives the frame. At this time, the Receiver Address field may include a Prefix field indicating the address of the second wireless communication terminal that receives a frame and a Band Indication field indicating a channel that the second wireless communication terminal is able to access. At this time, the Prefix field may have a value of a group address indicating the plurality of second wireless communication terminals. In addition, the Band Indication field may include a plurality of bits indicating whether each of the plurality of channels is able to access. In a specific embodiment, the Band Indication field may include eight bits. At this time, the first bit of the Band Indication field indicates whether primary channel Primary is able to access. In addition, the second to eighth bits of the Band Indication field indicate whether the first secondary channel Secondary 1 to the seventh secondary channel Secondary 7 are able to access. For example, when the primary channel Primary, the first secondary channel Secondary 1, the second secondary channel Secondary 2, and the third secondary channel Secondary 3 are available channels, the values of the first, second, and third bits in the Band Indication field are 1s. Therefore, the value of the Band Indication field is 240(11110000b).

In addition, the frame indicating a channel to be used to access the first wireless communication terminal by the second wireless communication terminal may include a Transmitter Address field indicating the address of the first wireless communication terminal that transmits the frame.

In addition, the frame indicating a channel to be used to access the first wireless communication terminal by the second wireless communication terminal may include an FCS field indicating whether an error occurs.

Figure 21:
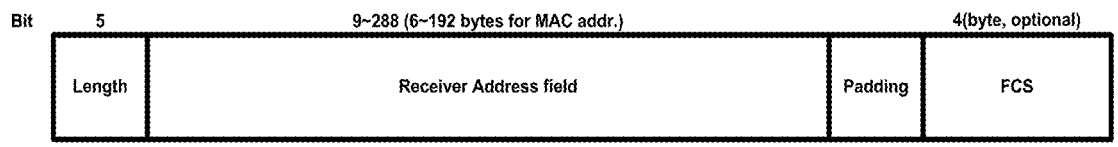
FIG. 21 is a view illustrating a structure of an extension field of a frame indicating that there is data to be transmitted to a plurality of second wireless communication terminals according to an embodiment of the present invention.

FIG. 21 is a view illustrating a structure of an extension field of a frame indicating that there is data to be transmitted to a plurality of second wireless communication terminals according to an embodiment of the present invention.

As described above, the frame indicating that there is data to be transmitted to a plurality of second wireless communication terminals may include a plurality of second wireless communication terminal identifiers for identifying each of the plurality of second wireless communication terminals. At this time, the second wireless communication identifier may be an association identifier for identifying the association of the first wireless communication terminal and the second wireless communication terminal. Specifically, the association identifier may be an AID. At this time, the association identifier may be a Partial AID. In another specific embodiment, the second wireless communication terminal identifier may be a MAC address. When transmission for four second wireless communication terminals is available in each of eight bandwidths, a frame indicating that there is data to be transmitted to a plurality of second wireless communication terminals may include not more than 32 second wireless communication terminal identifiers.

In a specific embodiment, a frame indicating that there is data to be transmitted to a plurality of second wireless communication terminals may have a format in which an extension field located after the FCS field of an existing RTS frame in an existing RTS frame is added. At this time, the extension field includes a plurality of second wireless communication terminal identifiers for identifying each of the plurality of second wireless communication terminals.

In the embodiment of FIG. 21, the extension field includes a length field indicating the length of the extension field.

Also, the extension field may include a Receiver Address field indicating an identifier for identifying a plurality of second wireless communication terminals that are to receive data.

Also, the extension field may include a Padding field indicating padding data for adjusting the total length of the extension field in an octet unit.

In addition, the extension field may include an FCS field indicating whether the extension field includes an error.

Through the frame indicating that there is data to be transmitted to the plurality of second wireless communication terminals, the first wireless communication terminal may efficiently inform that there is data to be transmitted to the plurality of second wireless communication terminals.

Figure 22:
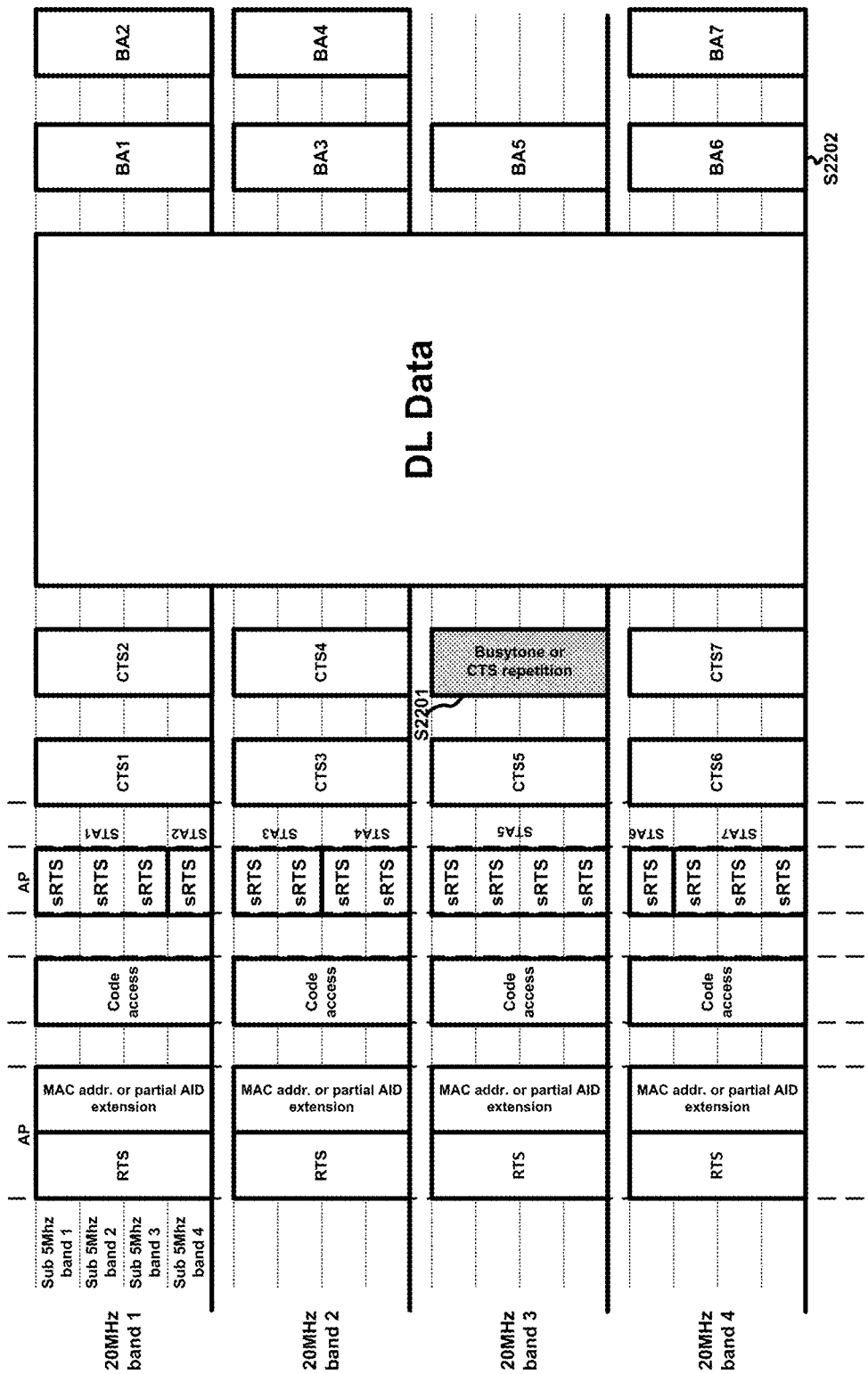
FIG. 22 is a view illustrating that an access point transmits data to a plurality of stations by using a frame indicating that data is transmitted to a plurality of wireless communication terminals according to another embodiment of the present invention.

FIG. 22 is a view illustrating that an access point transmits data to a plurality of stations by using a frame indicating that data is transmitted to a plurality of wireless communication terminals according to another embodiment of the present invention.

As described above, a plurality of second wireless communication terminals, which receive each of a plurality of allocated sub-channels of the same channel, may sequentially transmit a frame indicating ready to receive data to the first wireless communication terminal. At this time, the first wireless communication terminal may wait for a predetermined time to receive a frame indicating ready to receive data. After a predetermined time elapses, the first wireless communication terminal transmits data based on whether a frame indicating ready to receive data is prepared. At this time, the predetermined time may be a time required for transmitting a frame indicating that the first wireless communication terminal is ready to receive data as much as the number of the second wireless communication terminals that allocate a channel. For example, when a frame indicating that the first wireless communication terminal allocates a channel to two second wireless communication terminals and the first wireless communication terminal is ready to receive data is a CTS frame, the first wireless communication terminal may wait until each of the two second wireless communication terminals transmits the CTS frame.

At this time, if a smaller number of the second wireless communication terminals are allocated to any one channel than another channel, while the first wireless communication terminal waits to receive a frame indicating ready to receive data from another channel, a corresponding channel may be an idle state. Therefore, another wireless communication terminals not participating in transmission may access a corresponding channel. In order to prevent this, the second wireless communication terminal that receives an allocated channel may transmit dummy data through a corresponding channel while the first wireless communication terminal waits to receive a frame indicating ready to receive data from another channel. At this time, the second wireless communication terminal may transmit dummy data to the first wireless communication terminal or a predetermined address. In another specific embodiment, the second wireless communication terminal that receives a corresponding allocated channel may again transmit a frame indicating ready to receive data through a corresponding channel while the first wireless communication terminal wait to receive a frame indicating ready to receive data from another channel. At this time, the second wireless communication terminal may transmit a frame indicating ready to receive data to the first wireless communication terminal or a predetermined address.

For this, the second wireless communication terminal should know the number of the second wireless communication terminals that receive a corresponding allocated channel. In a specific embodiment, in order to determine the number of the second wireless communication terminals that receive a corresponding allocated channel, the second wireless communication terminal may monitor all the frequency bands used by the first wireless communication terminal. Specifically, the second wireless communication terminal may determine the number of the second wireless communication terminals that receive a corresponding allocated channel based on the number of frames indicating a channel allocated to the second wireless communication terminal, which are transmitted through a corresponding channel. In another specific embodiment, the frame indicating a channel allocated to the second communication terminal may include information on the number of the second wireless communication terminals allocated to the corresponding channel. At this time, the second wireless communication terminal may determine the number of the second wireless communication terminals allocated to a corresponding channel based on the frame indicating the channel allocated to the second communication terminal.

In addition, the second wireless communication terminal may receive data and transmit a Block ACK frame as a frame indicating whether data is received. At this time, the block ACK frame is a frame indicating whether a plurality of data frames are received. Specifically, the plurality of second wireless communication terminals, which respectively receive a plurality of allocated sub-channels of the same channel, may sequentially transmit block ACK frames to the first wireless communication terminal through a corresponding channel. At this time, the order of transmitting a block ACK frame from the second wireless communication terminal to the first wireless communication terminal may be an arrangement order of information on a channel allocated to the second wireless communication terminal included in the frame indicating the allocated channel received by the second wireless communication terminal. Specifically, when the frame indicating the channel allocated to the second wireless communication terminal includes information on the channel allocation in the order of the first sub-channel and the second sub-channel, the second wireless communication terminal that receives the allocated first sub-channel may transmit a block ACK frame to the first wireless communication terminal, and the second wireless communication terminal that receives the allocated second sub-channel may transmit a block ACK frame to the first wireless communication terminal. The second wireless communication terminal may transmit a block ACK frame through a band having a bandwidth of 20 MHz. In such a case, the first wireless communication terminal may not transmit an ACK-to-Self frame in order for compatibility with a wireless communication terminal that does not support the embodiment of the present invention. Also, according to a specific situation, a time required for transmitting a Block ACK frame by the second wireless communication terminal may be less than a time required for transmitting an sACK frame by the second wireless communication terminal.

In the embodiment of FIG. 22, the access point AP transmits data to the first station STA1 to the seventh station STA7. The operations that the first to seventh stations STA1 to STA7 access the access point AP and receive an sRTS frame indicating a channel allocated to the first to seventh stations STA1 to STA7 are identical to those of the embodiment of FIG. 19. Therefore, a detailed description thereof will be omitted.

The first to seventh stations STA1 to STA7 transmit a CTS frame indicating ready to receive data to the access point AP. Specifically, the first station STA1 and the second station STA2 sequentially transmit CTS frames to the access point AP through a first band (20 MHz band1) including a sub-band allocated to the first station STA1 and the second station STA2. In addition, the third station STA3 and the fourth station STA4 sequentially transmit CTS frames to the access point AP through a second band (20 MHz band2) including a sub-band allocated to the third station STA3 and the fourth station STA4. In addition, the sixth station STA6 and the seventh station STA7 sequentially transmit CTS frames to the access point AP through a fourth band (20 MHz band4) including a sub-band allocated to the sixth station STA6 and the seventh station STA7. At this time, the fifth station STA5 receives an allocated third band (20 MHz band 3) alone. Therefore, the fifth station STA5 transmits a CTS frame to the access point AP through the third band (20 MHz band3). Then, while the access point AP receives the CTS frame transmitted by the other stations, the fifth station STA5 transmits dummy data or a CTS frame again through the third band (20 MHz band3). Through this, the fifth station STA5 prevents another wireless communication terminal from accessing the third band (20 MHz band3).

The access point AP transmits data to the first station STA1 to the seventh station STA7 that transmit the CTS frame. The access point AP may transmit data to the first station STA1 to the seventh station STA7 through the above-described embodiments. In addition, the access point AP may transmit data to the first station STA1 to the seventh station STA7 through a method other than the above-described embodiment.

The first station STA1 to the seventh station STA7 transmit a block ACK frame indicating whether data is received to the access point AP. Specifically, the first station STA1 and the second station STA2 sequentially transmit block ACK frames to the access point AP through a first band (20 MHz band1) including a sub-band allocated to the first station STA1 and the second station STA2. In addition, the third station STA3 and the fourth station STA4 sequentially transmit block ACK frames to the access point AP through a second band (20 MHz band2) including a sub-band allocated to the third station STA3 and the fourth station STA4. In addition, the sixth station STA6 and the seventh station STA7 sequentially transmit block ACK frames to the access point AP through a fourth band (20 MHz band4) including a sub-band allocated to the sixth station STA6 and the seventh station STA7. In addition, the fifth station STA5 transmits a block ACK frame to the access point AP through the third band (20 MHz band3).

Figure 23:
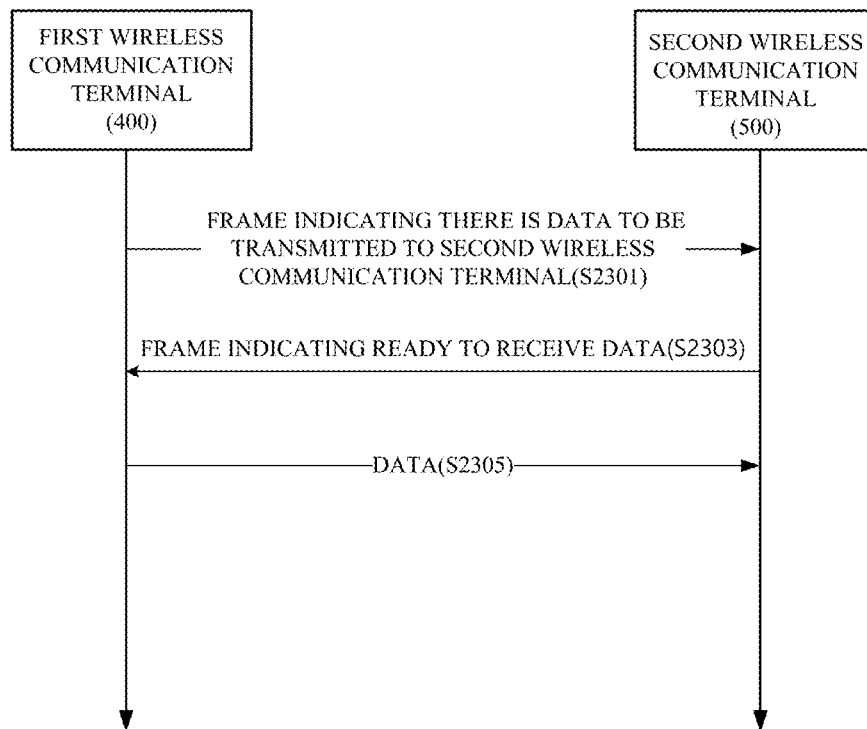
FIG. 23 is a ladder diagram illustrating an operation that a first wireless communication terminal transmits data to a second wireless communication terminal according to an embodiment of the present invention.

FIG. 23 is a ladder diagram illustrating an operation that a first wireless communication terminal transmits data to a second wireless communication terminal according to an embodiment of the present invention.

The first wireless communication terminal 400 transmits a frame indicating that there is data to be transmitted to the second wireless communication terminal 500 (S2301). Specifically, the frame indicating that there is data to be transmitted may be a frame indicating that there is data to be transmitted to a plurality of second wireless communication terminals 500. At this time, the frame indicating that there is data to be transmitted to the plurality of second wireless communication terminals 500 may include a plurality of identifiers for identifying each of the plurality of second wireless communication terminals 500 that are to receive the data. At this time, the identifier may be a connection identifier for identifying the connection between the first wireless communication terminal 400 and the second wireless communication terminal 500. In addition, the connection identifier may be AID. In addition, the connection identifier may be a partial AID indicating a part of the entire AID. In another specific embodiment, the identifier may be a MAC address. In addition, the frame indicating that there is data to be transmitted to the plurality of second wireless communication terminals 500 may include a group identifier for identifying a group indicating the plurality of second wireless communication terminals 500 that are to receive the data. In addition, in a specific embodiment, the format of the frame indicating that there is data to be transmitted may be a modification of the format of the existing RTS frame as described above The first wireless communication terminal 400 may transmit a frame indicating a method of accessing the first wireless communication terminal 400 to the second wireless communication terminal 500. The frame indicating an access method may include information on at least one of an access time point, an orthogonal code used for access, and a channel used for access. In addition, the frame indicating an access method may include information on a plurality of methods of accessing the first wireless communication terminal 500. In addition, the frame indicating a method of accessing the first wireless communication terminal 400 may be the same as the frame indicating that there is data to be transmitted. In another specific embodiment, the frame indicating a method of accessing the first wireless communication terminal 400 may be separated from the frame indicating that there is data to be transmitted.

At this time, the second wireless communication terminal 500 may access the first wireless communication terminal 400 through a method designated by the first wireless communication terminal 400. In addition, the second wireless communication terminal 500 may randomly select any of a plurality of methods designated by the first wireless communication terminal 400 and access the first wireless communication terminal 400. Specifically, the second wireless communication terminal 500 may randomly select any one of accessible channels indicated by a frame indicating an access method and access it. Also, the second wireless communication terminal 500 may access the first wireless communication terminal 400 through all the channels detected as idle channels by using a method designated by the first wireless communication terminal 400.

The first wireless communication terminal 400 may transmit a frame indicating a channel allocated to the second wireless communication terminal 500 to the second wireless communication terminal 500. Specifically, the first wireless communication terminal 400 may transmit a frame indicating a channel allocated to the second wireless communication terminal to the second wireless communication terminal 500 accessing the first wireless communication terminal 400. At this time, a channel allocated to a second wireless communication terminal may indicate a channel and also a sub-channel that is the sub-band of the channel. In addition, the frame indicating the channel allocated to the second wireless communication terminal may include information on the order in which the second wireless communication terminal uses the allocated channel. In a specific embodiment, the frame indicating the channel allocated to the second wireless communication terminal may include information that the second wireless communication terminal uses the allocated channel firstly or secondly. At this time, the information on whether the allocated channel is used firstly or secondly by a corresponding second wireless communication terminal may be in a 1-bit flag format. As described above, in a specific embodiment, the frame indicating the channel allocated to the second wireless communication terminal may be referred to as an sRTS frame.

The second wireless communication terminal 500 transmits to the first wireless communication terminal 400 a frame indicating ready to receive data based on a frame indicating that there is data to be transmitted (S2303). Specifically, when the frame indicating that there is data to be transmitted includes the identifier of the second wireless communication terminal 500, the second wireless communication terminal 500 may transmit a frame indicating ready to receive data to the first wireless communication terminal 400. Also, the second wireless communication terminal 500 may transmit a frame indicating ready to receive data to the first wireless communication terminal 400 through a channel allocated to the second wireless communication terminal 500. When receiving an allocated sub-channel, the second wireless communication terminal 500 may transmit to the first wireless communication terminal 400 a frame indicating ready to receive data through a channel having a corresponding sub-channel as a sub-band. Specifically, the plurality of second wireless communication terminals 500 that receive allocated sub-channels included in the same channel may sequentially transmit frames indicating ready to receive data. In a specific embodiment, the plurality of second wireless communication terminals 500 that receive allocated sub-channels included in the same channel may sequentially transmit frames indicating ready to receive data according to a round-robin method. In addition, the order of transmitting a frame indicating ready to receive data from the second wireless communication terminal 500 to the first wireless communication terminal 400 may be an arrangement order of information on a channel allocated to the second wireless communication terminal 500 included in the frame indicating a channel allocated to the second wireless communication terminal 500. Specifically, when the frame indicating the channel allocated to the second wireless communication terminal 500 includes information on the channel allocation in the order of the first sub-channel and the second sub-channel, the second wireless communication terminal 500 that receives the allocated first sub-channel may first transmit a frame indicating ready to receive data to the first wireless communication terminal 400. Then, the second wireless communication terminal 500 that receives the second sub-channel may transmit a frame indicating ready to receive data to the first wireless communication terminal 400.

The first wireless communication terminal 400 transmits data to the second wireless communication terminal 500 (S2305). Accordingly, the second wireless communication terminal 500 may receive data from the first wireless communication terminal 400 based on the frame indicating that there is data to be transmitted. Specifically, when the frame indicating that there is data to be transmitted indicates that there is data to be transmitted to the plurality of second wireless communication terminal 500 and includes the identifier of the second wireless communication terminal 500, the second wireless communication terminal 500 identified by the identifier may receive data from the first wireless communication terminal 400. In a specific embodiment, the first wireless communication terminal 400 may transmit data to the second wireless communication terminal 500 that transmits a frame indicating ready to receive the data. At this time, the first wireless communication terminal 400 may use a plurality of RF chains for the plurality of respective second wireless communication terminals 500. In another specific embodiment, the first wireless communication terminal 400 may group a plurality of second wireless communication terminals 500 into a plurality of groups, and allocate one RF-chain to one group including the plurality of second wireless communication terminals 500. At this time, the first wireless communication terminal 400 may group the second wireless communication terminals 500 based on a data transmission time required for each of the plurality of second wireless communication terminals 500. More specifically, when the difference in time required for data transmission to each of the plurality of second wireless communication terminals 500 is within a reference value, the first wireless communication terminal 400 may group the plurality of second wireless communication terminals 500 into one group. In another specific embodiment, the first wireless communication terminal 400 may group the plurality of second wireless communication terminals 500 based on the size of data to be transmitted to each of the plurality of second wireless communication terminals 500. Specifically, when the difference in the size of data to be transmitted to each of the plurality of second wireless communication terminals 500 is within a reference value, the first wireless communication terminal 400 may group the plurality of second wireless communication terminals 500 into one group.

The first wireless communication terminal 400 may transmit data to the plurality of second wireless communication terminals 500 by varying a channel access method of each of the plurality of RF-chains. Specifically, the first wireless communication terminal 400 may occupy a channel according to a predetermined period, with respect to a channel included in the first RF-chain among the plurality of RF-chains. In addition, with respect to a channel included in the second RF-chain, the first wireless communication terminal 400 may detect whether a corresponding channel is idle and occupy a channel through a contention procedure. In a specific embodiment, the first wireless communication terminal 400 may occupy a channel through a PCF included in the first RF-chain among the plurality of RF-chains and occupy a channel included in the second RF-chain through a DCF.

Before all the data transmissions for a plurality of second wireless communication terminals 500 using one RF-chain are completed, the first wireless communication terminal 400 may transmit dummy data to any one of the second wireless communication terminals 500 that complete the transmission. At this time, the dummy data represents meaningless data that is distinguished from meaningful data transmitted through a data frame. Specifically, the dummy data may be a continuous pattern of a specific value such as "0". Specifically, the first wireless communication terminal 400 may transmit data to the second wireless communication terminal 500 after the transmission of a data frame. Specifically, the first wireless communication terminal 400 may transmit dummy data to the second wireless communication terminal 500 after transmitting the FCS field of a data frame. In a specific embodiment, the dummy data may be referred to as a busytone. At this time, the second wireless communication terminal 500 may ignore the dummy data.

In another specific embodiment, the first wireless communication terminal 400 may repeatedly transmit data to any one second wireless communication terminal 500 that completes transmission before all the data transmissions for the plurality of second wireless communication terminals are completed. At this time, the first wireless communication terminal 400 may transmit the same data again after transmitting the data frame to the second wireless communication terminal 500. Specifically, the first wireless communication terminal 400 may again transmit the same data frame to the second wireless communication terminal 500 after transmitting the FCS field of the data frame. At this time, the second wireless communication terminal 500 may ignore the transmitted data repeatedly.

The first wireless communication terminal 400 transmits data to the second wireless communication terminal 500. Specifically, the first wireless communication terminal 400 may transmit data based on the frame indicating ready to receive data from the second wireless communication terminal 500. At this time, the first wireless communication terminal 400 may transmit information indicating that the data transmission is completed to the second wireless communication terminal 500. In such a case, the second wireless communication terminal 500 may enter a sleep mode based on the information indicating that the data transmission is completed. Specifically, the second wireless communication terminal 500 may maintain the sleep mode until data transmission for another second wireless communication terminal 500 included in the same RF-chain is completed. In a specific embodiment, the second wireless communication terminal 500 may maintain the sleep mode for a time obtained by subtracting the elapsed time from the duration field value of the frame indicating the channel allocated to the second wireless communication terminal 500 or the duration field value of the CTS-to-Self frame. The information indicating that the transmission is terminated may be predefined. Additionally, the information indicating that the transmission is terminated may have a repeated specific pattern. Specifically, the information indicating that the transmission is terminated may be similar to the auto-detection pattern of the preamble of 802.11ac. In a specific embodiment, the information indicating that the transmission is terminated may be referred to as an ending-tone as described above.

In another specific embodiment, without the information indicating that the transmission is terminated, the second wireless communication terminal 500 may enter the sleep mode after a value of the duration field of a frame indicating a channel allocated to the second wireless communication terminal 500. In such a case, the duration field value of the frame indicating the channel allocated to the second wireless communication terminal 500 indicates the time required for transmitting data to be transmitted to the second wireless communication terminal 500.

In another specific embodiment, the second wireless communication terminal 500 may perform the sleep mode based on information indicating the number of symbols of data included in the preamble of a signal including data. Specifically, the second wireless communication terminal 500 may receive data as many as the number of symbols indicated by the information indicating the number of symbols of data and then, enter the sleep mode. At this time, the preambles of all signals transmitted by a sub-channel unit may include information indicating the number of symbols of data. At this time, the information indicating the number of symbols of data included in the preamble of the signal may be referred to as a length field.

When data transmission to all of the plurality of second wireless communication terminals 500 is completed, the second wireless communication terminal 500 entering the sleep mode may wake-up. At this time, the second wireless communication terminal 500 may wake-up when all the data transmissions for the plurality of second wireless communication terminals 500 are completed.

In addition, the first wireless communication terminal 400 may transmit data to another second wireless communication terminal 500 whose data transmission is not completed through a channel allocated to any one second wireless communication terminal 500 whose data transmission is completed. Specifically, another second wireless communication terminal 500 may be a second wireless communication terminal 500 whose data transmission is not completed among a plurality of second wireless communication terminals 500. In another specific embodiment, another second wireless communication terminal 500 may be a second wireless communication terminal 500 that does not start to receive data when the data transmission for any one second wireless communication terminal 500 is completed.

In addition, as described above, while transmitting data to the plurality of second wireless communication terminals 500, the first wireless communication terminal 400 may transmit information indicating that the data transmission is completed to a second wireless communication terminal 500 whose data transmission is completed first among the plurality of second wireless communication terminals 500. After transmitting the information indicating that the data transmission is completed, the first wireless communication terminal 400 may transmit data to another second wireless communication terminal 500 through a channel allocated to a second wireless communication terminal 500 whose data transmission is completed first among the plurality of second wireless communication terminals 500.

At this time, the first wireless communication terminal 400 may transmit a guard interval signal after transmitting information indicating that the data transmission is completed in order to prevent interference between signals. After transmitting the guard interval signal, the first wireless communication terminal 400 may transmit data to another second wireless communication terminal 500 through a channel allocated to a second wireless communication terminal 500 whose data transmission is completed first among the plurality of second wireless communication terminals 500. At this time, the guard interval signal may be a Nulling signal.

The plurality of second wireless communication terminals 500 that receive data may transmit the frame indicating whether data is received to the first wireless communication terminal 400.

In another specific embodiment, the second wireless communication terminal 500 that first complete data reception among the plurality of second wireless communication terminals 500 may transmit to another second wireless communication terminal 500 a frame indicating whether the second wireless communication terminal 500 receives the data. Specifically, the second wireless communication terminal 500 that receives the information indicating that the transmission is terminated may transmit to another wireless communication terminal 500 a frame indicating whether the second wireless communication terminal 500 receives data. For example, the second wireless communication terminal 500 may transmit a frame indicating whether data is received to another second wireless communication terminal 500 through a channel allocated to the second wireless communication terminal 500. At this time, another second wireless communication terminal 500 may be a second wireless communication terminal that currently receives data. In addition, a frame indicating whether data is received or not may be referred to as an sACK as described above.

After the completion of all the data transmission for the plurality of second wireless communication terminals 500, another second wireless communication terminal 500 that receives the frame indicating whether data is received may transmit a frame indicating that the plurality of second wireless communication terminals 500 receive data. Specifically, another second wireless communication terminal 500 that receives the frame indicating whether data is received may transmit a frame indicating whether the plurality of second wireless communication terminals 500 receive data through a channel including a sub-channel allocated to the second wireless communication terminal 500. At this time, the frame indicating whether the plurality of second wireless communication terminals 500 receive data may be referred to as an Agg ACK. A specific method of generating the Agg ACK may be based on the embodiment described with reference to FIGS. 13 to 15.

In another specific embodiment, the second wireless communication terminal may receive data and transmit a Block ACK frame as a frame indicating whether data is received. At this time, the block ACK frame is a frame indicating whether a plurality of data frames are received. The plurality of second wireless communication terminals 500, which respectively receive a plurality of sub-channels of the same channel, may sequentially transmit block ACK frames to the access point AP through a corresponding channel. At this point, the order of transmitting a block ACK frame from the second wireless communication terminal 500 to the first wireless communication terminal 400 may be an arrangement order of information on a channel allocated to the second wireless communication terminal 500 included in the frame indicating a channel allocated to the second wireless communication terminal 500.

Figure 24:
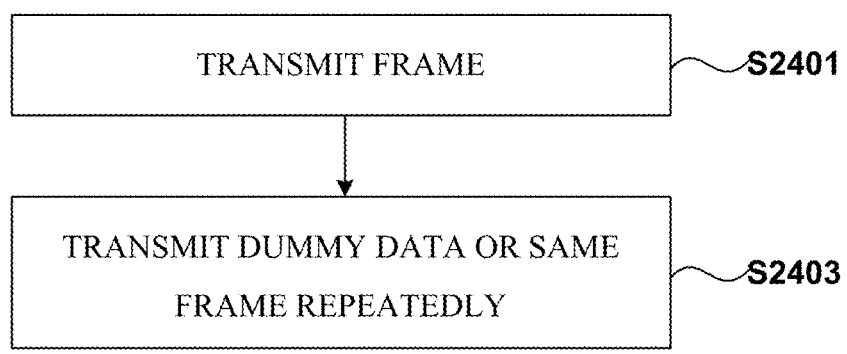
FIG. 24 is a ladder diagram illustrating a frame transmission operation of a wireless communication terminal according to an embodiment of the present invention.

FIG. 24 is a ladder diagram illustrating a frame transmission operation of a wireless communication terminal according to an embodiment of the present invention.

As described above, when one RF-chain is used in the communication between the first wireless communication terminal and the plurality of second wireless communication terminals, the first wireless communication terminal may independently perform switching between transmission and reception for each of the plurality of second wireless communication terminals. Therefore, the first wireless communication terminal needs to synchronize switching between transmission and reception for each of the plurality of second wireless communication terminals. In addition, the first wireless communication terminal that communicates with the plurality of second wireless communication terminals has a larger computation burden than the first wireless communication terminal that communicates with one second wireless communication terminal. In order to solve such a problem, the first wireless communication terminal or the second wireless communication terminal may repeatedly transmit dummy data or the same frame. Specifically, the wireless communication terminal may perform the following operations.

The wireless communication terminal transmits a frame to another wireless communication terminal (S2401). At this time, the wireless communication terminal that transmits the frame may be the first wireless communication terminal, and the wireless communication terminal that receives the frame may be the second wireless communication terminal. In another specific embodiment, the wireless communication terminal that transmits the frame may be the second wireless communication terminal, and the wireless communication terminal that receives the frame may be the first wireless communication terminal.

In addition, the frame transmitted by the wireless communication terminal may be a data frame including data. In another specific embodiment, the frame transmitted by the wireless communication terminal may be a control frame.

The wireless communication terminal transmits dummy data to another wireless communication terminal or transmits the same frame repeatedly (S2403). Specifically, the wireless communication terminal may transmit a data frame to another wireless communication terminal, transmit dummy data, or repeatedly transmit the same frame. In a specific embodiment, the wireless communication terminal may transmit the FCS field of the data frame to another wireless communication terminal, and then transmit dummy data or repeatedly transmit the same frame. At this time, the dummy data may indicate meaningless data that is distinguished from meaningful data transmitted through a data frame. Specifically, the dummy data may be a continuous pattern of a specific value such as "0".

Through this operation, the wireless communication terminal may prevent another wireless communication terminal from accessing a channel before switching between transmission and reception of the RF-chain. In addition, through this, the wireless communication terminal may reduce the processing burden of a terminal that receives a frame.

As described above, although wireless LAN communication is exemplarily described for the present invention, the present invention is not limited thereto and may be identically applied to another communication system such as cellular communication. In addition, although the method, device and system of the present invention are described in relation to specific embodiments, the configuration elements, a part of or the entirety of operations of the present invention may be implemented using a computer system having general purpose hardware architecture.

In the foregoing, features, structures, or effects described in connection with embodiments are included in at least one embodiment, and are not necessarily limited to one embodiment. Furthermore, the exemplified features, structures, or effects in various embodiments can be combined and modified by those skilled in the art. Accordingly, contents in connection with these combination and modification should be construed to fall in the scope of the present invention.

Although embodiments have been described with reference to a number of illustrative embodiments thereof, it should be understood that numerous other modifications and embodiments can be devised by those skilled in the art that will fall within the spirit and scope of the principles of the present invention. For example, variations and modifications in the component parts and/or arrangements, alternative uses will also be apparent to those skilled in the art. In addition, differences related to such modifications and application should be interpreted to be within the scope of the present invention defined in the appended claims.

The invention claimed is:

1. A wireless communication terminal comprising:
a transceiver; and
a processor,
wherein the processor is configured to:
receive, by using the transceiver, data from a base wireless communication terminal through a sub-band while the base wireless communication terminal is performing simultaneous transmission to the wireless communication terminal and one or more other wireless communication terminals other than the wireless communication terminal through one or more other sub-bands, wherein the simultaneous transmission is transmitted through a frequency band including the sub-band and other sub-bands by using orthogonal frequency division multiplexing access (OFDMA),
when a transmission of data to the wireless communication terminal from the base wireless communication terminal during the simultaneous transmission is terminated, enter a sleep mode for power saving while a transmission of data to the one or more other wireless communication terminals from the base wireless communication terminal during the simultaneous transmission is going on, wherein a dummy data including value 0 is transmitted from the base wireless communication terminal after the transmission of the data to the wireless communication terminal is terminated during the simultaneous transmission, and the dummy data is transmitted until the transmission of the data to the one or more other wireless communication terminals is terminated, and
wake up from the sleep mode based on an end of the simultaneous transmission.

2. The wireless communication terminal of claim 1, wherein the transceiver is configured to receive information indicating that the transmission of the data to the wireless communication terminal during the simultaneous transmission is terminated,
wherein the processor is configured to enter the sleep mode based on the information.

3. An operation method of a wireless communication terminal, the method comprising:
receiving data from the base wireless communication terminal through a sub-band, while the base wireless communication terminal is performing simultaneous transmission to the wireless communication terminal and one or more other wireless communication terminals other than the wireless communication terminal through one or more other sub-bands, wherein the simultaneous transmission is transmitted through a frequency band including the sub-band and other sub-bands by using orthogonal frequency division multiplexing access (OFDMA);
when a transmission of data to the wireless communication terminal during the simultaneous transmission is terminated, entering a sleep mode for power saving while a transmission of data to the one or more other wireless communication terminals from the base wireless communication terminal during the simultaneous transmission is going on, wherein a dummy data including value 0 is transmitted from the base wireless communication terminal after the transmission of the data to the wireless communication terminal is terminated during the simultaneous transmission, and the dummy data is transmitted until the transmission of the data to the one or more other wireless communication terminals is terminated; and
waking up from the sleep mode based on an end of the simultaneous transmission.

4. The method of claim 3, wherein the entering a sleep mode comprises:

receiving information indicating that the transmission of the data to the wireless communication terminal during the simultaneous transmission is terminated, and entering the sleep mode based on the information.

* * * * *